United States Patent
Mizoe et al.

(10) Patent No.: US 10,972,013 B2
(45) Date of Patent: Apr. 6, 2021

(54) SWITCHING POWER SUPPLY DEVICE WITH CURRENT LIMITING OPERATION BY FEEDBACK CURRENT

(71) Applicant: NEW JAPAN RADIO CO., LTD., Tokyo (JP)

(72) Inventors: Kimiyoshi Mizoe, Fujimino (JP); Toru Konno, Fujimino (JP)

(73) Assignee: NEW JAPAN RADIO CO., LTD., Tokyo (JP)

( * ) Notice: Subject to any disclaimer, the term of this patent is extended or adjusted under 35 U.S.C. 154(b) by 0 days.

(21) Appl. No.: 16/702,263

(22) Filed: Dec. 3, 2019

(65) Prior Publication Data

US 2020/0177085 A1    Jun. 4, 2020

(30) Foreign Application Priority Data

Dec. 3, 2018  (JP) ................................ 2018-226537
Oct. 30, 2019  (JP) ................................ 2019-197834

(51) Int. Cl.
*H02M 3/335*    (2006.01)
*H02M 1/32*    (2007.01)

(52) U.S. Cl.
CPC .......... *H02M 3/33523* (2013.01); *H02M 1/32* (2013.01)

(58) Field of Classification Search
CPC ............................................. H02M 3/335–42
See application file for complete search history.

(56) References Cited

U.S. PATENT DOCUMENTS

2018/0351464 A1* 12/2018 Finkel ..................... H02M 1/08

2019/0305674 A1* 10/2019 Liu ......................... H02M 1/00
2020/0106363 A1* 4/2020 Yoshizawa ........ H02M 3/33507

FOREIGN PATENT DOCUMENTS

JP          2005027412 A     1/2005

OTHER PUBLICATIONS

W. Kleebchampee and C. Bunlaksananusom, "Modeling and Control Design of a Current-Mode Controlled Flyback Converter with Optocoupler Feedback," 2005 International Conference on Power Electronics and Drives Systems, Kuala Lumpur, 2005, pp. 787-792 (Year: 2005).*

* cited by examiner

*Primary Examiner* — Peter M Novak
(74) *Attorney, Agent, or Firm* — Procopio, Cory, Hargreaves & Savitch LLP

(57) ABSTRACT

A switching power supply device includes a switching transistor, a sense resistor, a transformer, an optocoupler, and a current limiting feedback circuit. The switching transistor is controlled to be turned on and turned off. The sense resistor is configured to generate a sense voltage when the switching transistor is turned-on. The transformer includes a primary winding to which an input voltage is applied when the switching transistor is turned-on, a secondary winding is configured to supply an output voltage to a load, and an auxiliary winding that is configured to detect the output voltage. The optocoupler is configured to generate first and second optocoupler currents corresponding to the output voltage. The current limiting feedback circuit is configured to generate first, second, and third feedback currents using a voltage of the auxiliary winding, the first, second, and third feedback currents being in inverse proportion to the output voltage.

10 Claims, 16 Drawing Sheets

SWITCHING POWER SUPPLY DEVICE WITH CURRENT LIMITING OPERATION BY FEEDBACK CURRENT

CROSS REFERENCE TO RELATED APPLICATIONS

This application claims priority from Japanese Patent Application No. 2018-226537 filed on Dec. 3, 2018 and Japanese Patent Application No. 2019-197834 filed on Oct. 30, 2019, the entire contents of which are incorporated herein by reference.

BACKGROUND OF THE INVENTION

Field of the Invention

The present invention relates to a switching power supply device as a DC/DC converter in which a transformer and an optocoupler are used.

Description of Related Art

FIG. 18 shows a circuit of a switching power supply device of a related art (Patent Literature 1: JP-A-2005-027412A). A reference numeral 60 represents a transformer including a primary winding L11, a first auxiliary winding L12, a secondary winding L13, and a second auxiliary winding L14. A reference numeral MN11 represents a switching transistor of an NMOS, and a reference numeral 70 represents an optocoupler including a photodiode PD2 and a phototransistor PT2. Reference numerals R11 to R19 represent resistors, a reference numeral Rs2 represents a sense resistor that detects a drain current of the switching transistor MN11, and reference numerals C11 to C15 represent capacitors.

In this switching power supply device, when a voltage divided from an output voltage Vout at the resistors R18 and R19 is higher than a reference voltage Vref11 of a voltage source VB11, an output voltage of an operational amplifier OP11 decreases according to the difference voltage. When the output voltage of the operational amplifier OP11 is lower than or equal to a predetermined value, a current flows through the photodiode PD2 of the optocoupler 70 according to the value of the output voltage, and an internal resistance of the phototransistor PT2 is determined depending on the emission amount of light emitted from the photodiode PD2.

When a power supply voltage Vin is applied, the capacitor C13 charges with an excitation current such that the resistor R13 side is a positive electrode, the excitation current flowing to the first auxiliary winding L12 through the resistors R11 and R13. When a voltage of a common connection point of the capacitor C13 and the resistor R13 reaches a threshold voltage of the switching transistor MN11, the switching transistor MN11 turns on.

As a result, when a current starts flowing through the primary winding L11 to which the switching transistor MN11 is connected due to the DC voltage Vin, an induced electromotive force is generated from each of the windings L12, L13, and L14 of the transformer 60, and the energy is stored in the transformer 60. The induced voltage (the • side is a positive electrode) generated from the first auxiliary winding L12 is superimposed on the voltage of the capacitor C13. Therefore, a gate voltage of the switching transistor MN11 is maintained greater than or equal to a threshold voltage, and the on-state of the switching transistor continues.

At this time, the drain current of the switching transistor MN11 flows through the sense resistor Rs2, and a sense voltage generated from the sense resistor Rs2 charges the capacitor C12 through the resistor R15. An excitation current flowing through the primary winding L11 increases substantially linearly over time after the switching transistor MN11 turns on. Therefore, the voltage of the capacitor C12 also increases accordingly.

Next, when the voltage of the capacitor C12 reaches a threshold voltage of a transistor Q11, the transistor Q11 enters an on-state, the gate voltage of the switching transistor MN11 decreases to less than or equal to a threshold voltage, and the switching transistor MN11 turns off.

When the switching transistor MN11 turns off such that a current flowing through the primary winding L11 is interrupted, a flyback voltage is generated from each of the windings L11 to L14. At this time, the flyback voltage generated from the secondary winding L13 is rectified and smoothed by a diode D11 and the capacitor C14 and is output as the output voltage Vout.

On the other hand, the flyback voltage generated from the first auxiliary winding L12 is proportional to the flyback voltage generated from the secondary winding L13, the capacitor C13 charges with the flyback voltage (the • side is a negative electrode) generated from the first auxiliary winding L12 through the resistors R12 and R13 such that the resistor R13 side is a positive electrode, and the switching transistor MN11 is promoted to turn on.

After the switching transistor MN11 turns off, the current of the primary winding L11 is interrupted. Therefore, the voltage generated from the sense resistor Rs2 is zero, the output voltage Vout is low, and the phototransistor PT2 does not operate. Thus, the voltage of the capacitor C12 decreases while being discharged through the resistors R15 and Rs2. As a result, when the voltage of the capacitor C12 is less than or equal to the threshold voltage of the transistor Q11, the transistor Q11 turns off.

However, an equivalent diode functions between a base and a collector of the transistor Q11. Therefore, the capacitor C13 charges with a current such that the resistor R13 side a positive electrode, the current flowing through the sense resistor Rs2, the resistor R15, the base and the collector of the transistor Q11, and the resistor R13 from a side of the first auxiliary winding L12 opposite to the • side.

When the release of the electric energy stored in the secondary winding L13 is finished by flyback, a ringing of the voltage of the primary winding L11 around the input voltage Vin starts due to a parasitic capacitance of the switching transistor MN11, a stray capacitance of the primary winding L11, and an inductance of the primary winding L11, and the polarity thereof is inverted due to voltage drop.

The voltage on the capacitor C13 side of the first auxiliary winding L12 that oscillates in proportion to a ringing of the voltage of the primary winding L11 also changes in the same manner, and the polarity is returned after the flyback voltage ceases. In this case, the voltage is applied as a forward voltage to a gate of the switching transistor MN11. In addition, the voltage of the capacitor C13 that has been charged is added to this voltage. Therefore, when this total voltage is higher than the threshold voltage of the switching transistor MN11, the switching transistor MN11 turns on again. In this way, a series of RCCs are repeated.

At this time, the output voltage Vout is low, and the optocoupler 70 does not operate. Therefore, the phototransistor PT2 does not affect the gate voltage of the switching transistor MN11, and the switching transistor MN11 operates in a maximum on-period that is determined by a resistance value of the sense resistor Rs2. Next, the output voltage Vout increases whenever oscillation repeats, and when the output voltage Vout is higher than a set voltage corresponding to the reference voltage Vref11, a comparing operation of the operational amplifier OP11 starts, and the process proceeds to a normal operation where the optocoupler 70 operates.

In this normal operation, when the output voltage Vout is higher than the set voltage, the voltage of the capacitor C12 also contributes to charging by the voltage generated from the sense resistor Rs2, and the capacitor C12 also charges with the current flowing through the phototransistor PT2 of the optocoupler 70. Therefore, as the output voltage Vout becomes higher, an on-timing of the transistor Q11 is advanced. Therefore, an off-timing of the switching transistor MN11 is advanced. That is, an on-period of the switching transistor MN11 is shortened.

When the switching transistor MN11 turns off, the off-state of the switching transistor MN11 continues until the voltage on the resistor R13 side of the capacitor C13 that charges with the flyback voltage of the first auxiliary winding L12 reaches the threshold voltage of the switching transistor MN11.

In the switching power supply device, when a voltage divided from the input voltage Vin at the resistors R11 and R12 is less than a predetermined value, a bias voltage of the switching transistor MN11 is reduced, and the switching transistor MN11 does not turn on/off.

[Patent Literature 1] JP-A-2005-027412A

SUMMARY

In the switching power supply device shown in FIG. 18, the second auxiliary winding L14 is required to obtain an optocoupler current.

In addition, the voltage on the resistor R13 side of the capacitor C13 controls the gate of the switching transistor MN11. Therefore, a problem exists in that an on-timing of the switching transistor MN11 is affected by a variation in threshold of the switching transistor MN11. In addition, the switching transistor MN11 turns off when the charging voltage of the capacitor C12 reaches the threshold of the transistor Q11. Therefore, there a problem exists in that the off-timing of the switching transistor MN11 is affected by a variation in threshold of the transistor Q11.

Further, when a load current increases, there is only a method of suppressing a drain peak current of the switching transistor MN11 by operations of the resistor Rs2 and the transistor Q11, and a current limiting function is insufficient. In particular, when an output is short-circuited, a high current flows such that a power supply device may be broken or damaged due to overheating or the like. There is also no method of setting current limiting operation characteristics for protecting the power supply device from breakage when an output is short-circuited.

One or more embodiments provide a switching power supply device having a current limiting function in which a second auxiliary winding for obtaining an optocoupler current is unnecessary. The turn-on or turn-off of the switching transistor is not affected by a variation in threshold of the switching transistor, and operation characteristics can be freely set when a load current increases.

In an aspect (1), one or more embodiments provide a switching power supply device including a switching transistor controllable to turn on and turn off, a sense resistor that is configured to generate a sense voltage when the switching transistor turns-on, a transformer including a primary winding to which an input voltage is applied when the switching transistor turns-on, a secondary winding that is configured to supply an output voltage to a load, and an auxiliary winding that is configured to detect the output voltage, an optocoupler that is configured to generate a first optocoupler current and a second optocoupler current corresponding to the output voltage, a current limiting feedback circuit that is configured to generate a first feedback current, a second feedback current, and a third feedback current using an undulating voltage of the auxiliary winding, the first feedback current, the second feedback current, and the third feedback current being in inverse proportion to the output voltage, an on-period control circuit that is configured to receive the sense voltage, the first optocoupler current, and the first feedback current and generate an off-timing signal of the switching transistor, and an off-period control circuit that is configured to charge by a constant current or a difference current between the constant current and the third feedback current, receive a charging voltage of a fourth capacitor discharged when the switching transistor is turned-on, the second feedback current, and the second optocoupler current, and generate an on-timing signal of the switching transistor. When a load voltage is less than or equal to a second output voltage that is less than a first output voltage, the current limiting feedback circuit is configured to generate the first feedback current, the second feedback current, and the third feedback current. When the load voltage is higher than the first output voltage, the on-period control circuit is configured to receive the sense voltage and the first optocoupler current and the off-period control circuit is configured to receive the charging voltage of the fourth capacitor charged by the constant current and the second optocoupler current. When the output voltage is less than the second output voltage, the on-period control circuit is configured to receive the sense voltage and the first feedback current, and the off-period control circuit is configured to receive the charging voltage of the fourth capacitor charged by the difference current between the constant current and the third feedback current and the second feedback current.

In an aspect (2), when the load voltage is less than the second output voltage, the current limiting feedback circuit may be controlled to be enabled.

In an aspect (3), the first feedback current, the second feedback current, and the third feedback current of the current limiting feedback circuit may be independent of each other, and the first optocoupler current and second optocoupler current of the optocoupler may be independent of each other.

In an aspect (4), the switching power supply device may further includes a first resistor connected between the auxiliary winding and the current limiting feedback circuit. The first feedback current, the second feedback current, and the third feedback current may be currents that are held at an inversion timing of the undulating voltage generated in the auxiliary winding, the currents are in inverse proportion to a current that flows through the first resistor by the undulating voltage generated in the auxiliary winding in an off-period of the switching transistor.

In an aspect (5), the on-period control circuit may be configured to generate the off-timing signal of the switching transistor at an earlier timing as the first optocoupler current is increasing, as the first feedback current is increasing, and as the sense voltage is increasing. The off-period control circuit may be configured to generate the on-timing signal of the switching transistor at a slower timing as the second optocoupler current is increasing, as the second feedback current is increasing, and as the third feedback current is increasing.

In an aspect (6), the on-period control circuit includes a second resistor and a first comparator. The second resistor may be inserted into a path through which the first optocoupler current or the first feedback current flows when the switching transistor turns on.

The first comparator may be configured to generate the off-timing signal when a second voltage generated at an introduction side of the first feedback current or the first optocoupler current of the second resistor is the same as the sense voltage.

In an aspect (7), the off-period control circuit may include a third resistor and a second comparator. The third resistor may be inserted such that a voltage drop from the charging voltage of the fourth capacitor occurs due to the second optocoupler current or the second feedback current. The second comparator may be configured to generate the on-timing signal when a third voltage of a terminal of the third resistor on a side opposite to the fourth capacitor side is a predetermined value.

In an aspect (8), the on-timing signal of the off-period control circuit may be retimed at an inversion timing of an undulating voltage generated in the auxiliary winding.

In an aspect (9), the current limiting feedback circuit may include a current holding circuit. The current holding circuit may generates a sampled signal in inverse proportion to the output voltage at a timing at which the switching transistor turns off when the load voltage is less than or equal to the second output voltage less than the first output voltage, and hold the first feedback current, the second feedback current, and the third feedback current that are corresponding to the sampled signal until the switching transistor turns off after the signal is sampled.

In an aspect (10), when the load voltage is less than or equal to a predetermined voltage less than the second output voltage, the current holding circuit may be configured to release the holding of the first feedback current, the second feedback current, and the third feedback current and the first feedback current, the second feedback, and the third feedback current is configured to be output in inverse proportion to the load voltage.

According to one or more embodiments, the first and second optocoupler currents are used as sink currents. Therefore, an auxiliary winding as a power supply of a phototransistor is not necessary, and only one auxiliary winding is required. In addition, the switching transistor is controlled to turn on/off by the on-timing signal and the off-timing signal. Therefore, a timing at which the switching transistor turns on/off is not affected by a variation in threshold of the switching transistor. In addition, when the output voltage is less than the second output voltage, the switching transistor is controlled to turn on/off using the first to third feedback currents. Therefore, protection from overcurrent can be realized by controlling the on-period and the off-period to limit the input energy. Further, in the current limiting feedback circuit, the first feedback current to be received by the on-period control circuit and the second feedback current to be received by the off-period control circuit are generated independently of each other, and the third feedback current for discharging the fourth capacitor and the first and second feedback currents are generated independently of each other. Therefore, current limiting characteristics can be changed. By adjusting the current flowing through the auxiliary winding and the value of the fourth capacitor, any current limiting characteristics having a fold-back shape, a chevron shape, or a hanging-down type can be realized.

DESCRIPTION OF EMBODIMENTS

Figure 1:
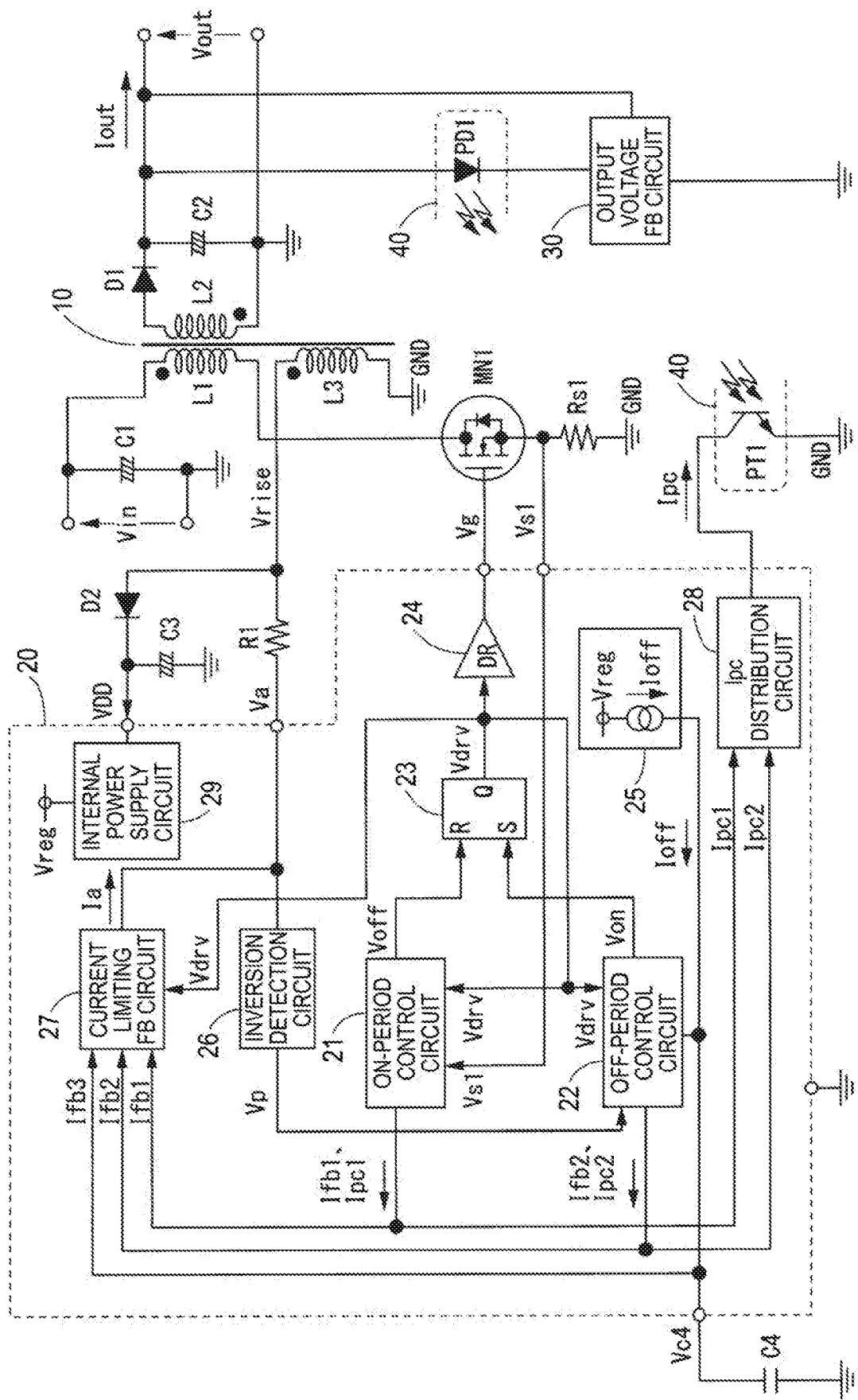
FIG. 1 is a block diagram showing a switching power supply device according to one embodiment of the present invention.

FIG. 1 shows a configuration of a switching power supply device according to one embodiment of the present invention. A reference numeral 10 represents a transformer including a primary winding L1, a secondary winding L2, and an auxiliary winding L3. An input DC voltage Vin is stabilized by a capacitor C1 and input to the primary winding L1, and the primary winding L1 transfers an excitation energy generated by an on/off operation of a switching transistor MN1 of an NMOS to the secondary winding L2 and the auxiliary winding L3. A rectifying-smoothing circuit including a diode D1 and a capacitor C2 is connected to the secondary winding L2, and an output DC voltage Vout is output from the rectifying-smoothing circuit. A rectifying-smoothing circuit including a diode D2 and a capacitor C3 is connected to the auxiliary winding L3, and a power supply voltage VDD is generated from the rectifying-smoothing circuit.

A reference numeral 20 represents a control circuit that controls the switching transistor MN1 such that the switching transistor MN1 turns on/off. In the control circuit 20, a reference numeral 21 represents an on-period control circuit that controls a time for which the switching transistor MN1 continuously turns on such that an off-timing voltage Voff is output, and a reference numeral 22 represents an off-period control circuit that controls a time for which the switching transistor MN1 continuously turns off such that an on-timing voltage Von is output. The off-period control circuit 22 includes an external capacitor C4.

A reference numeral 23 represents a SRFF circuit, and when the off-timing voltage Voff output from the on-period control circuit 21 is "H", the SRFF circuit is reset such that a drive voltage Vdrv output from a Q terminal is "L". When the on-timing voltage Von output from the off-period control circuit 22 is "H", the SRFF circuit is set such that the drive voltage Vdrv output from the Q terminal is "H".

A reference numeral 24 represents a drive circuit that receives an input of the drive voltage Vdrv output from the Q terminal of the SRFF circuit 23 and generates a gate voltage Vg for controlling the switching transistor MN1 such that the switching transistor MN1 turns on/off. When the drive voltage Vdrv is "H", the drive circuit 24 sets the gate voltage Vg to "H" such that the switching transistor MN1 turns on. When the drive voltage Vdrv is "L", the drive circuit 24 sets the gate voltage Vg to "L" such that the switching transistor MN1 turns off.

A reference numeral 25 represents a charging circuit that supplies a constant charging current Ioff to the external capacitor C4.

A reference numeral 26 represents an inversion detection circuit, and the inversion detection circuit 26 receives an undulating voltage Vrise generated from the auxiliary winding L3 through the resistor R1, generates a waveform-shaped pulse signal voltage Vp indicating an inversion (zero cross) timing of the undulating voltage Vrise, and outputs the pulse signal voltage Vp to the off-period control circuit 22 for retiming.

A reference numeral 27 represents a current limiting feedback circuit for detecting a decrease in the output voltage Vout, and when a current Ia flows, the current limiting feedback circuit 27 sinks feedback currents Ifb1, Ifb2, and Ifb3 that are in inverse proportion to a negative voltage component of the undulating voltage Vrise generated from the auxiliary winding 3. These three feedback currents Ifb1 to Ifb3 show higher values as the output voltage Vout becomes less than a predetermined voltage. The feedback current Ifb1 sinks a current from the on-period control circuit 21, the feedback current Ifb2 sinks a current from the off-period control circuit 22, and the feedback current Ifb3 sinks a discharge current of the capacitor C4.

A reference numeral 28 represents an Ipc distribution circuit that distributes an optocoupler current Ipc flowing through a phototransistor PT1 of an optocoupler 40 described below, and the Ipc distribution circuit sinks two optocoupler currents Ipc1 and Ipc2 in proportion to the optocoupler current Ipc. The Ipc distribution circuit 28 sinks the current Ipc1 from the on-period control circuit 21 and sinks the current Ipc2 from the off-period control circuit 22.

A reference numeral 29 represents an internal power supply circuit, and the internal power supply circuit 29 receives an input of a voltage VDD and generates a stabilized internal power supply voltage Vreg, the voltage VDD being obtained by rectifying and smoothing the undulating voltage Vrise using the rectifying-smoothing circuit including the diode D2 and the capacitor C3.

Figure 18:
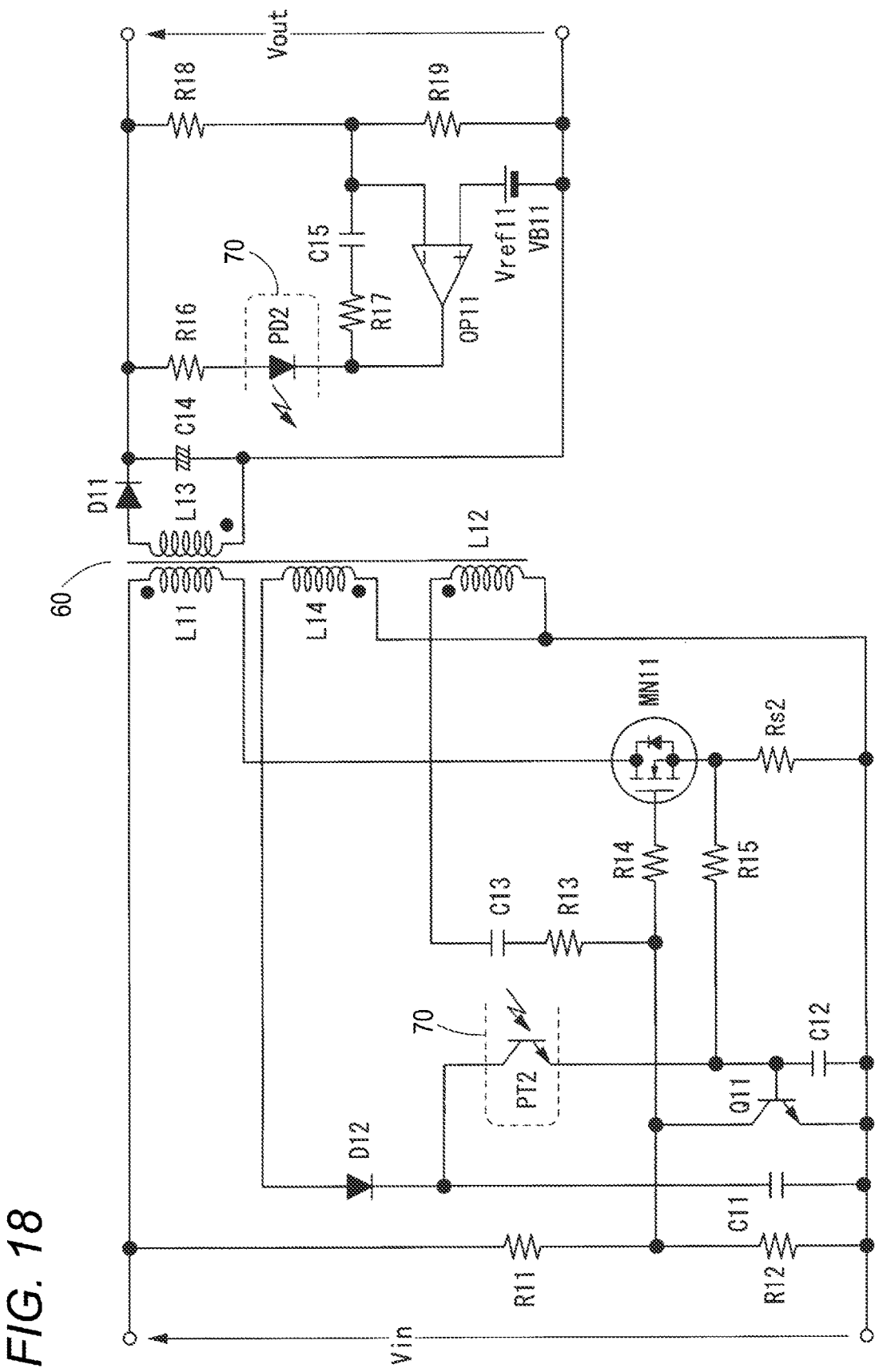
FIG. 18 is a circuit diagram showing a switching power supply device of the related art.

A reference numeral 30 represents an output voltage feedback circuit that detects the output voltage Vout, and the output voltage feedback circuit 30 is the same as the circuit shown in FIG. 18 including the operational amplifier OP11, the voltage source VB11, the capacitor C15, and the resistors R16, R17, R18, and R19. When the output voltage Vout is higher than a target value, the output voltage feedback circuit 30 increases a current flowing through the photodiode PD1 of the optocoupler 40 as the value of the output voltage Vout increases.

The optocoupler 40 includes the photodiode PD1 and the phototransistor PT1, and the phototransistor PT1 generates the optocoupler current Ipc in proportion to the emission amount of the photodiode PD1, that is, the value of the output voltage Vout.

Figure 2:
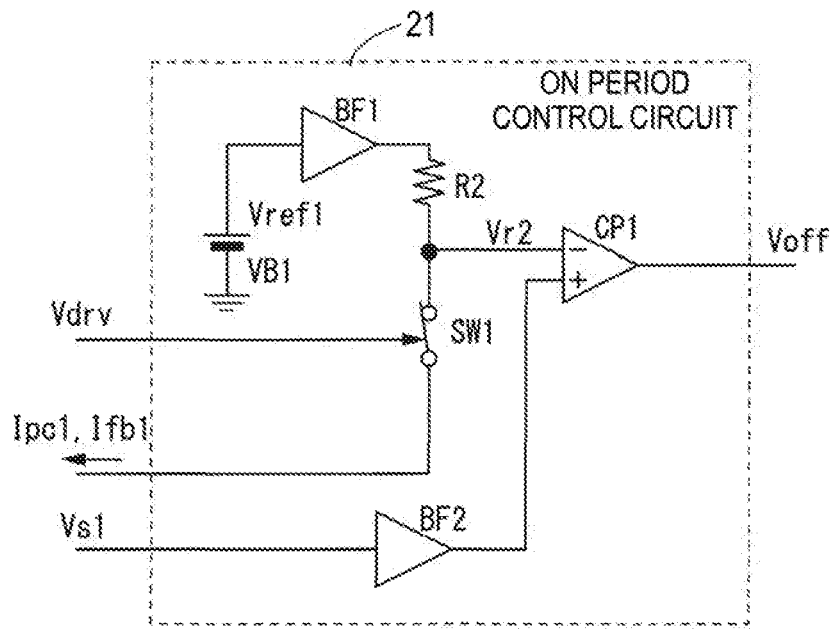
FIG. 2 is a circuit diagram showing an on-period control circuit of the switching power supply device of FIG. 1.

FIG. 2 is a specific circuit diagram showing the on-period control circuit 21. The on-period control circuit 21 includes: a voltage source VB1 of a reference voltage Vref1; a buffer BF1 for impedance transformation; a resistor R2; a switch SW1 that turns on and causes the optocoupler current Ipc1 or the feedback current Ifb to flow through the resistor R2 when the drive voltage Vdrv is "H"; a buffer BF2 that performs impedance transformation of a sense voltage Vs1 generated from a sense resistor Rs1 using a current flowing through the switching transistor MN1; and a comparator CP1 that compares a voltage Vr2 dropped through the resistor R2 and the sense voltage Vs1 to each other by causing the optocoupler current Ipc1 or the feedback current Ifb1 to flow.

In a period where the switching transistor MN1 turns off, the switch SW1 turns off. Therefore, the voltage Vr2 of an inverting input terminal of the comparator CP1 becomes Vref1, and the off-timing voltage Voff that is the output of the comparator CP becomes "L". However, when the switch SW1 turns on, the optocoupler current Ipc1 or the feedback current Ifb1 flows through the resistor R2. Therefore, the voltage Vr2 of the inverting input terminal of the comparator CP1 decreases to "Vref1−R2×(Ipc1 or Ifb1)". When the sense voltage Vs1 is higher than the voltage Vr2, the off-timing voltage Voff output from the comparator CP1 changes from "L" to "H".

In this way, the on-period control circuit 21 advances a timing at which the off-timing voltage Voff changes from "L" to "H" as the optocoupler current Ipc1 increases, as the feedback current Ifb1 increases, and as the sense voltage Vs1 increases, and controls a period in which the switching transistor MN1 turns on such that the period is shortened.

Figure 3:
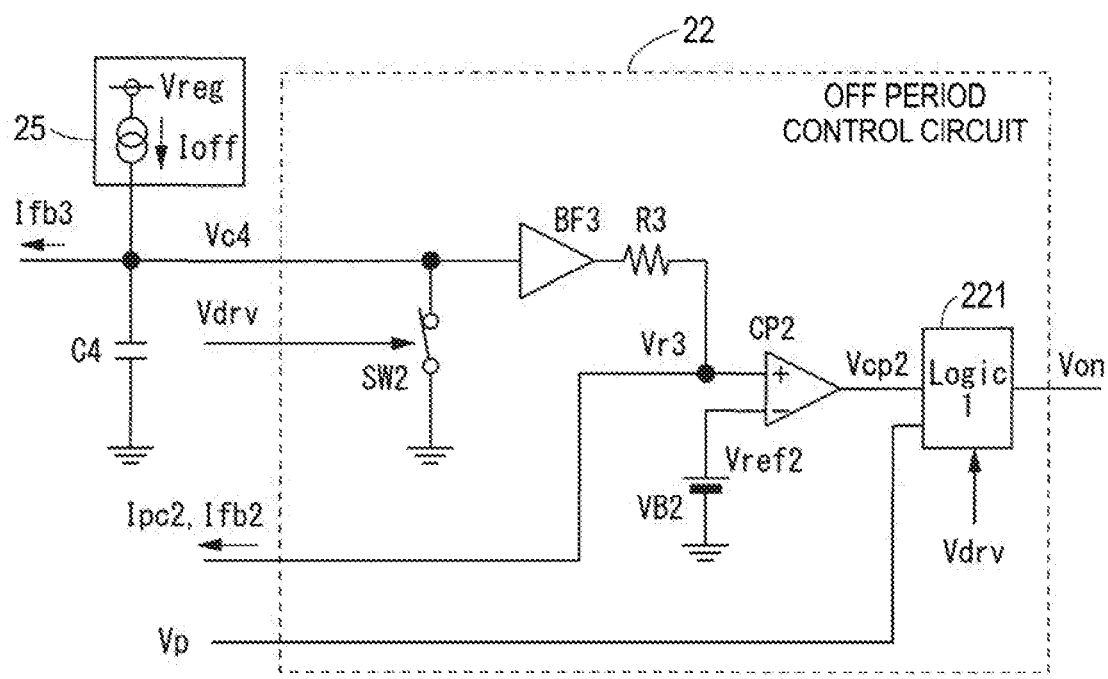
FIG. 3 is a circuit diagram showing an off-period control circuit of the switching power supply device of FIG. 1.

FIG. 3 is a specific circuit diagram showing the off-period control circuit 22. The off-period control circuit 22 includes: a switch SW2 that turns on when the drive voltage Vdrv is "H"; a buffer BF3 for impedance transformation; a resistor R3; a comparator CP2 including an inverting input terminal to which a reference voltage Vref2 of a voltage source VB2 is set; and a logic circuit 221 that retimes an output voltage of the comparator CP2 at an output pulse signal voltage Vp of the inversion detection circuit 26 and can perform a latch operation as in a DFF circuit that generates the on-timing voltage Von. This logic circuit 221 is not necessarily provided. When the switch SW2 turns off, the external capacitor C4 charges with a difference current between a constant current Ioff of the charging circuit 25 and the feedback current Ifb3.

In the off-period control circuit 22, when the drive voltage Vdrv is "L", the switch SW2 turns off such that the capacitor C4 is charged to a voltage Vc4 at the difference current between the constant current Ioff and the feedback current Ifb3. The optocoupler current Ipc2 or the feedback current Ifb2 flows through the resistor R3. Therefore, a voltage Vr3 of a common connection point of the resistor R3 and a non-inverting input terminal of the comparator CP2 decreases as the optocoupler current Ipc2 or the feedback current Ifb2 increases. The voltage Vr3 increases as the difference current between the constant current Ioff and the feedback current Ifb3 increases. When the voltage Vr3 is higher than the reference voltage Vref2, an output voltage Vcp2 of the comparator CP2 changes from "L" to "H". When the pulse signal voltage Vp output from the inversion detection circuit 26 rises, the output voltage Vcp2 of the comparator CP2 is retimed in the logic circuit 221, and the on-timing voltage Von becomes "H". When the voltage Vdrv becomes "H" after the retiming, the on-timing voltage Von returns to "L" that is a state before the retiming.

In this way, a timing at which the on-timing voltage Von (="H") is generated is delayed as the optocoupler current Ipc2 increases, as the feedback current Ifb2 increases, and as the difference current between the constant current Ioff and the feedback current Ifb3 decreases (as the feedback current Ifb3 increases), and an off-period of the switching transistor MN1 increases.

Figure 4:
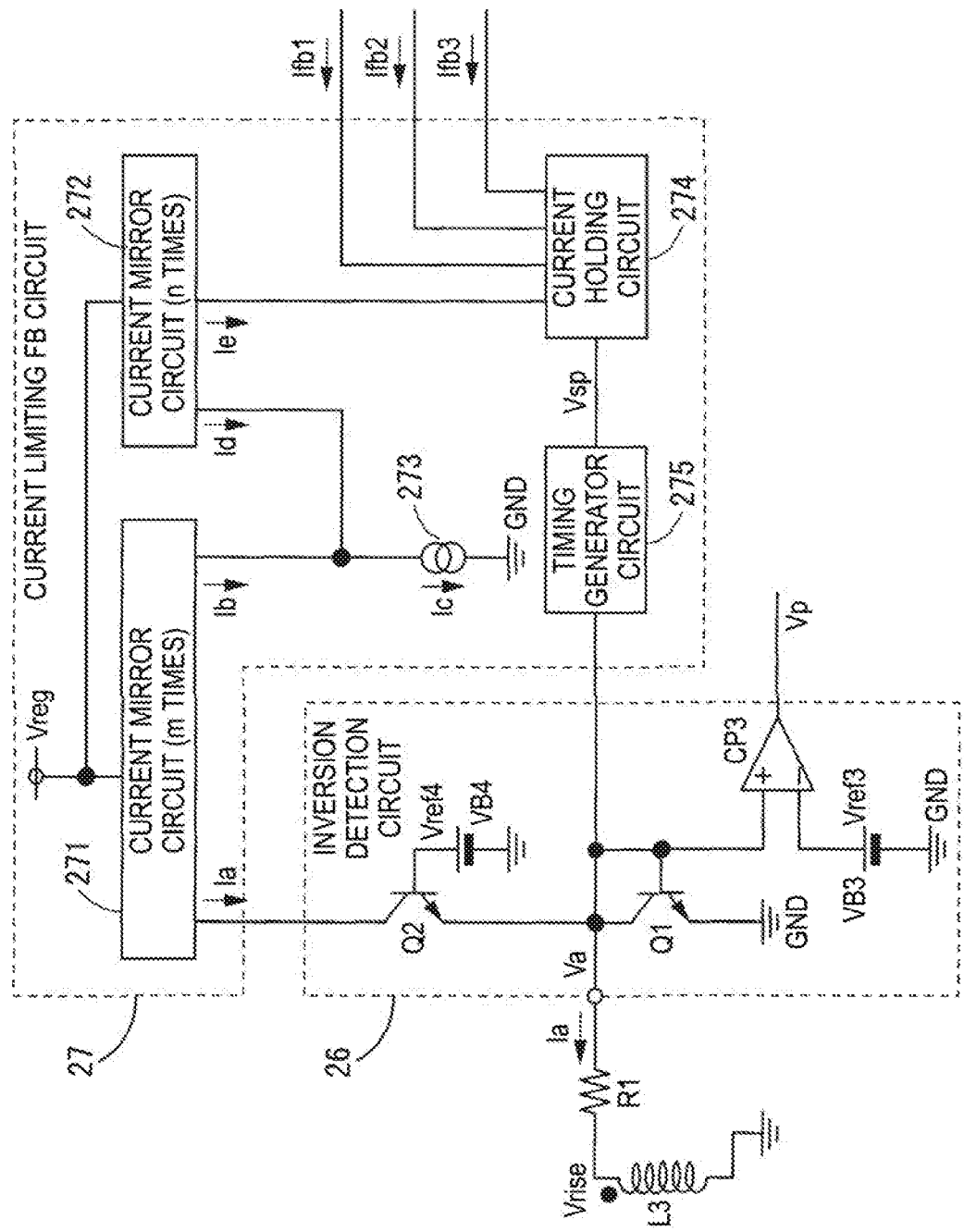
FIG. 4 is a circuit diagram showing a current limiting feedback circuit of the switching power supply device of FIG. 1.

FIG. 4 is a specific circuit diagram showing the inversion detection circuit 26 and a current limiting feedback circuit 27. The inversion detection circuit 26 includes: a comparator CP3 including an inverting input terminal to which a reference voltage Vref3 is set by a voltage source VB3; a diode-connected NPN transistor Q1 including a collector connected to the auxiliary winding L3 through the resistor R1; a transistor Q2 including an emitter connected to the auxiliary winding L3 through the resistor R1; and a voltage source VB4 that applies a reference voltage Vref4 to a base of the transistor Q2.

The transistor Q1 configures a maximum voltage limiting circuit and limits a maximum voltage of the non-inverting input terminal of the comparator CP3 to Vbe (Q1) when a voltage Vrise for causing the • side of the auxiliary winding L3 to be a positive electrode is generated from the auxiliary winding L3, that is, when the switching transistor MN1 turns on. Vbe (Q1) is a voltage between the base and the emitter of the transistor Q1. By connecting a resistor instead of the transistor Q1, a voltage divided from the voltage Vrise through the resistor and the resistor R1 may be input to the non-inverting input terminal of the comparator CP3 as a maximum voltage. The transistor Q2 configures a minimum voltage limiting circuit and limits a minimum voltage of the non-inverting input terminal of the comparator CP3 to "Vref4−Vbe (Q2)" when a voltage Vrise (=VL3) for causing the • side of the auxiliary winding L3 to be a negative electrode is generated from the auxiliary winding L3, that is, when the switching transistor MN1 turns off. Vbe (Q2) is a voltage between the base and the emitter of the transistor Q2. When the voltage of the non-inverting input terminal is higher than the reference voltage Vref3, the comparator CP3 outputs a signal of "H" as the pulse signal voltage Vp. When the voltage of the non-inverting input terminal is less than or equal to the reference voltage Vref3, the comparator CP3 outputs a signal of "L" as the pulse signal voltage Vp.

Using the inversion detection circuit 26, the output voltage Vcp2 of the comparator CP2 of the off-period control circuit 22 can be retimed at the waveform-shaped pulse signal voltage Vp at an inversion timing of the undulating voltage Vrise of the auxiliary winding L3 from the negative electrode to the positive electrode, and the switching transistor MN1 can turn on at a valley of a ringing of a drain voltage to perform a quasi-resonant operation. Therefore, during the quasi-resonant operation, the influence of a variation in threshold of the switching transistor MN1 can be excluded.

The current limiting feedback circuit 27 includes: a first current mirror circuit 271 that converts the current Ia flowing through the auxiliary winding L3 into an m-times current Ib and outputs the current Ib when the • side of the auxiliary winding L3 is the negative electrode, that is, the switching transistor MN1 turns off; a current source 273 of the constant current Ic; a second current mirror circuit 272 that receives an input of a current Id (=Ic−Ib), converts the current Id into a n-times current Ie, and outputs the current Ie; a current holding circuit 274 that receives an input of the current Ie and sinks the three feedback currents Ifb, Ifb2, and Ifb3 in proportion to the current Ie; and a timing generator circuit 275 that applies a voltage Vsp of a hold (sample) timing to the current holding circuit 274. The timing generator circuit 275 sets the voltage Vsp to "H" for a predetermined time after the side of the auxiliary winding L3 becomes a negative electrode. When the voltage Vsp changes from "H" to "L", the current holding circuit 274 samples the current Ie, stores the corresponding voltage in a capacitor C5 (refer to FIG. 5), and outputs the feedback currents Ifb1 to Ifb3 corresponding to the voltage held by the capacitor C5 for a period Th (refer to FIG. 8) from when the voltage Vsp changes to "L" to when the voltage Vsp changes to "H" (when the • side of the auxiliary winding L3 becomes a negative electrode").

Figure 5:
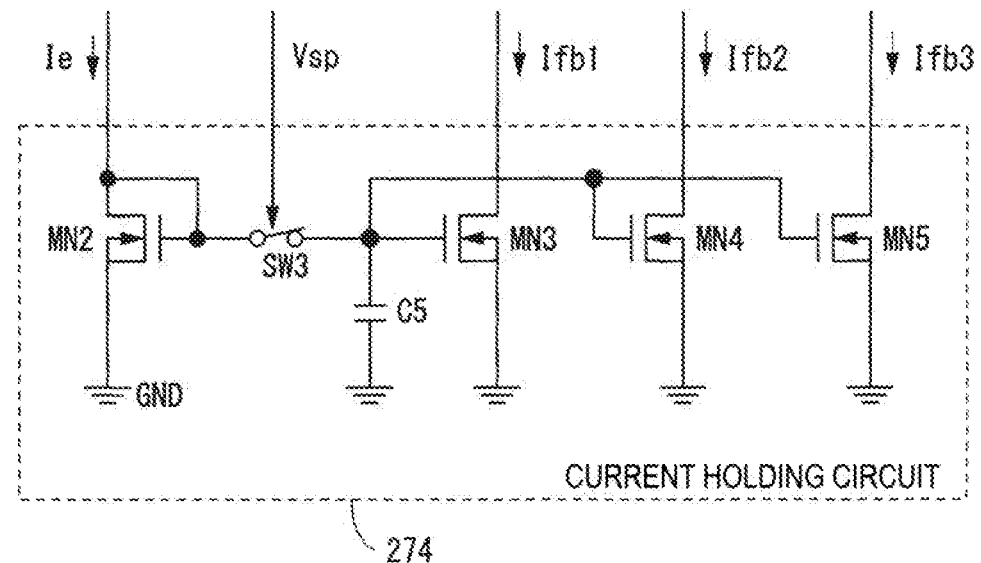
FIG. 5 is a circuit diagram showing a current holding circuit of the current limiting feedback circuit of FIG. 4.

FIG. 5 shows a specific circuit configuration of the current holding circuit 274. The current holding circuit 274 receives an input of the current Ie, configures a current mirror that outputs the three feedback currents Ifb1, Ifb2, and Ifb3 with NMOS transistors MN2, MN3, MN4, and MN5, and inserts a switch SW3 for sampling and the capacitor C5 between a gate of the transistor MN2 and gates of the transistors MN3 to MN5. When the voltage Vsp is in the state of "H", the switch SW3 turns on, and the feedback currents Ifb1 to Ifb3 in proportion to the current Ie are output. When the voltage Vsp changes from "H" to "L", the switch SW3 switches from on to off, and a hold operation is performed. In this way, the gate voltage of the transistor MN2 corresponding to the current Ie is held by the capacitor C5. Therefore, the feedback currents Ib to Ifb3 in proportion to the current Ie immediately before the switch SW3 switches from on to off are continuously output as they are.

When the output voltage Vout decreases to a voltage Vout2 (Vout2a, Vout2b, Vout2c described below), the value of the current Ic of the current source 273 is set to satisfy Ib=Ic. When the output voltage Vout is higher than the voltage Vout2, the value of the current Ic of the current source 273 is set to satisfy Ib>Ic. In this way, when the current value is in a range of Ib>Ic, the current Id does not flow. At this time, all the feedback currents Ib to Ifb3 do not also flow. Only when the output voltage Vout is not higher than Vout2, the current Ic of the current source 273 is set such that the feedback currents Ifb1 to Ifb3 flow. That is, the current source 273 configures a detection circuit of the output voltage Vout.

Figure 6:
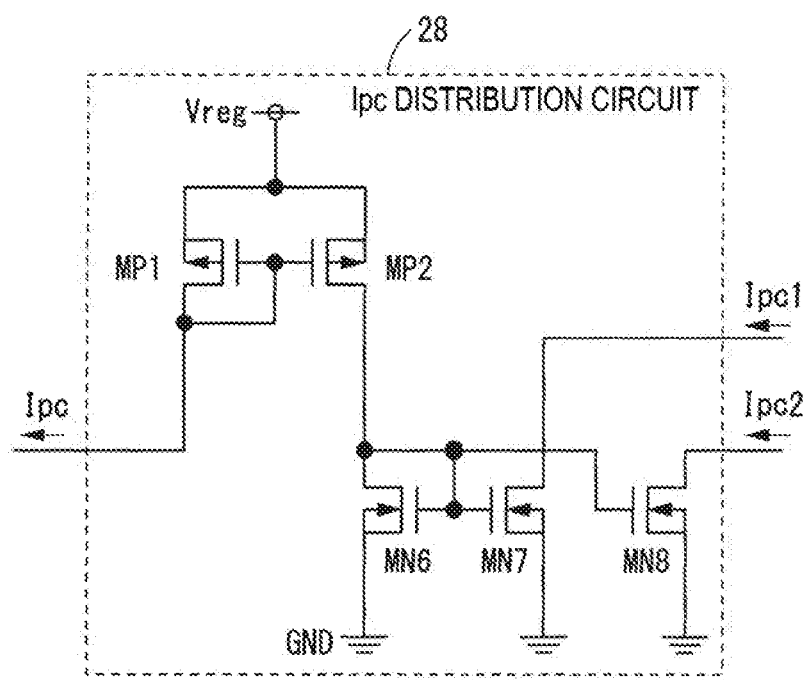
FIG. 6 is a circuit diagram showing an Ipc distribution circuit of the switching power supply device of FIG. 1.

FIG. 6 is a specific circuit diagram showing the Ipc distribution circuit 28. The Ipc distribution circuit 28 includes: current mirror-connected PMOS transistors MP1 and MP2 that receive an input of the optocoupler current Ipc; and current mirror-connected NMOS transistors MN6, MN7, and MN8 that receive an input of the drain current of the transistor MP2. The transistor MN7 sinks the optocoupler current Ipc1, and the transistor MN8 sinks the optocoupler current Ipc2.

<Normal Operation>

Figure 7A:
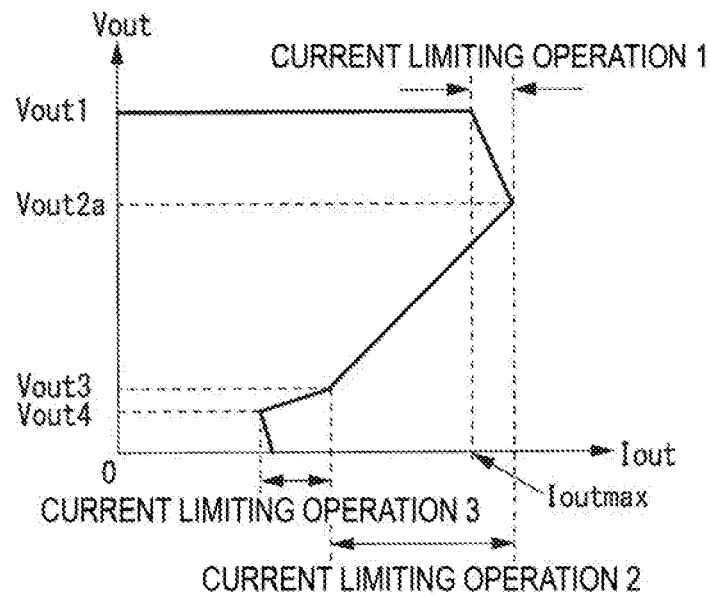
FIGS. 7A to 7C are characteristic diagrams showing a current limiting operation of the switching power supply device of FIG. 1.

Next, in a normal operation, as shown in FIG. 7A, the switching power supply device is constant-voltage-controlled such that the output voltage Vout becomes a target voltage Vout1. During the constant voltage control, an absolute value of a voltage when the voltage Vrise generated from the auxiliary winding L3 is a negative voltage is high, and an output current Iout is less than a maximum output current Ioutmax. During the constant voltage operation, when the • side of the auxiliary winding L3 is a negative electrode, the current Ia input to the current limiting feedback circuit 27 is high, and thus the current value satisfies Ib>Ic. Therefore, the currents Id and Ie are zero, and the feedback currents Ifb1 to Ifb3 are also zero. Accordingly, during the normal operation, an on-period obtained by the on-period control circuit 21 and an off-period obtained by the off-period control circuit 22 are controlled by the optocoupler currents Ipc1 and Ipc2 exclusively.

That is, when the output voltage Vout is higher than the target value Vout1, the optocoupler current Ipc1 increases, and the voltage Vr2 of the on-period control circuit 21 is controlled to be low. Accordingly, the off-timing voltage Voff output from the comparator CP1 becomes "l" at an early timing, and the on-period is shortened. In addition, the optocoupler current Ipc2 also increases, the voltage Vr3 of the off-period control circuit 22 is controlled to be low, the on-timing voltage Von output from the comparator CP2 becomes "H" at a slow timing, and the off-period increases. Due to these reasons, the output voltage Vout is controlled to be low.

When the output voltage Vout is less than the target value Vout1, the operation is contrary to that described above. That is, the off-timing voltage Voff is output from the on-period control circuit 21 at a slow timing, and the on-timing voltage Von is output from the off-period control circuit 22 at an early timing. Therefore, the output voltage Vout is controlled to be high.

<Current Limiting Operation 1>

Figure 8:
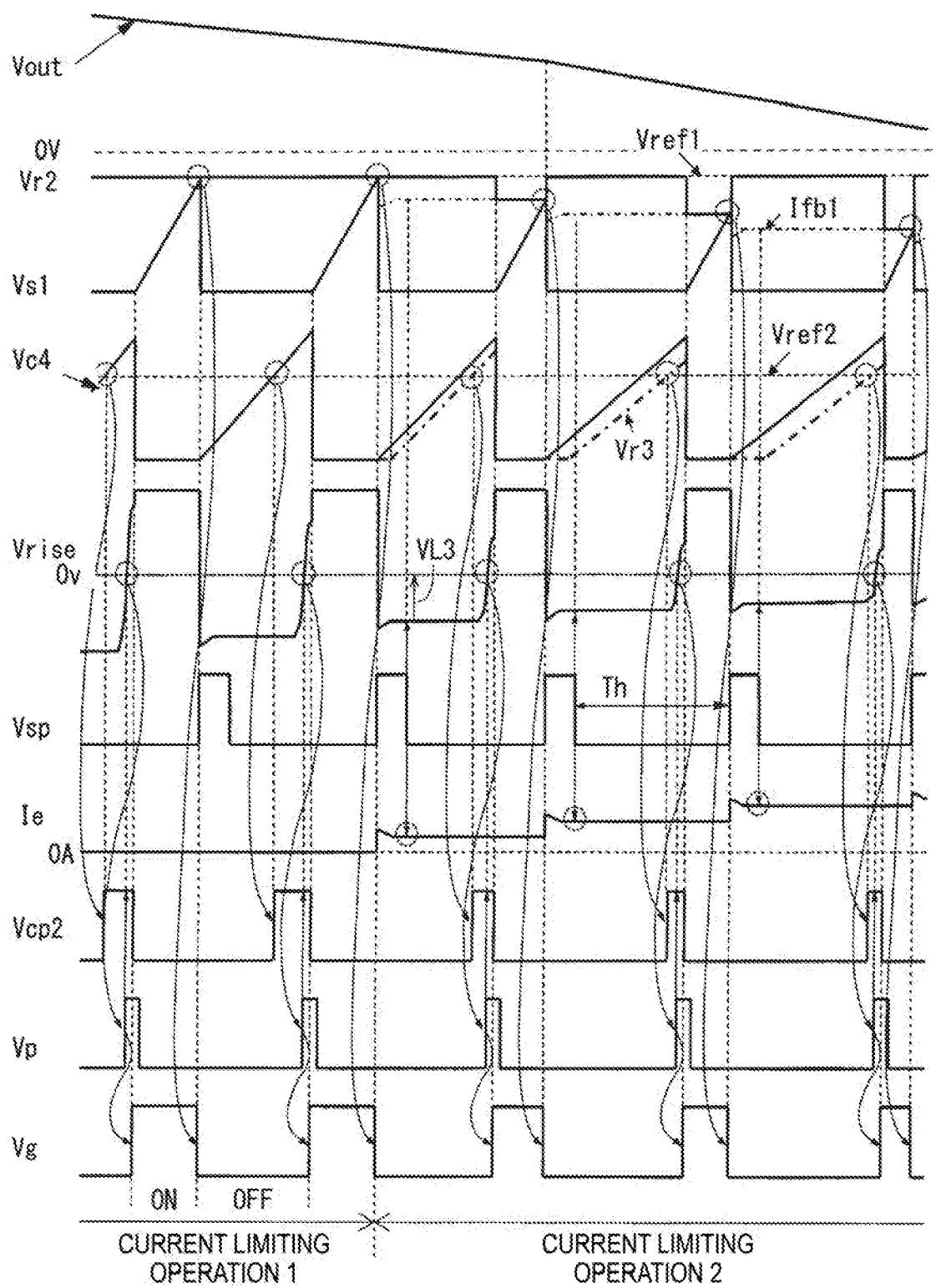
FIG. 8 is a timing chart showing transition from a current limiting operation 1 to a current limiting operation 2 of the switching power supply device of FIG. 1.

A current limiting operation 1 is a period of a current limiting operation 1 in a timing chart of FIG. 8. When the output current Iout increases and reaches a maximum value Ioutmax of FIG. 7A, the output voltage Vout starts to decrease. When the emission of the photodiode PD1 of the optocoupler 40 ends, the flow of the optocoupler current Ipc is stopped. In addition, at this time, the output voltage Vout is less than the voltage Vout1. However, the current Ia of the auxiliary winding L3 when the switching transistor MN1 turns off is high. Therefore, the current value of the current limiting feedback circuit 27 satisfies Ib>Ic. Accordingly, the currents Id and Ie do not flow, and the feedback currents Ifb1 to Ifb3 do not also flow.

At this time, in the on-period control circuit 21, the optocoupler current Ipc1 and the first feedback current Ifb1 are zero. Therefore, a voltage drop through the resistor R2 does not occur, the voltage Vr2 is equal to Vref1, a time required for the voltage Vr2 to become equal to the sense voltage Vs1 is maximum, and the on-period is maximum.

In addition, in the off-period control circuit 22, the optocoupler current Ipc2 and the second feedback current Ifb2 are zero. Therefore, the voltage Vr3 is equal to (Vr3=Vr4) the charging voltage Vc4 of the capacitor C4, and the voltage Vr3 is compared to the voltage Vret2 by the comparator CP2.

Accordingly, the off-period is determined based on the charging time at the constant current Ioff of the capacitor C4 and retiming in the logic circuit 221. At this time, the on-period is maximum, and the input energy in the on-period is limited to a given value. Therefore, the output power is also limited, an increase in the output current Iout is suppressed such that the current is limited, and the output voltage Vout decreases from the target voltage Vout1.

Further, when the output voltage Vout decreases, the conduction time of the secondary diode D1 increases. As a result, the on-duty decreases, the off-period increases, a time required for the charging voltage Vc4 of the capacitor C4 that charges with the constant current Ioff to reach the voltage Vret2 after the switch SW2 turns off is constant irrespective of the output voltage Vout. Therefore, the switching transistor MN1 turns on only by retiming in the logic circuit 221.

In a case where the charging time of the capacitor C4 (the value of the capacitor C4 or the value of the current Ioff) is set such that a critical mode operation is performed at the start of the current limiting operation, as the output voltage Vout decreases, the conduction time of the secondary diode D1 is longer than the charging time of the capacitor C4 that is set as a constant value. Therefore, the logic circuit 221 retimes the output voltage at the end of the conduction of the secondary diode D1, and the switching transistor MN1 turns on such that the current is limited in the critical mode operation.

<Current Limiting Operation 2>

Figure 9:
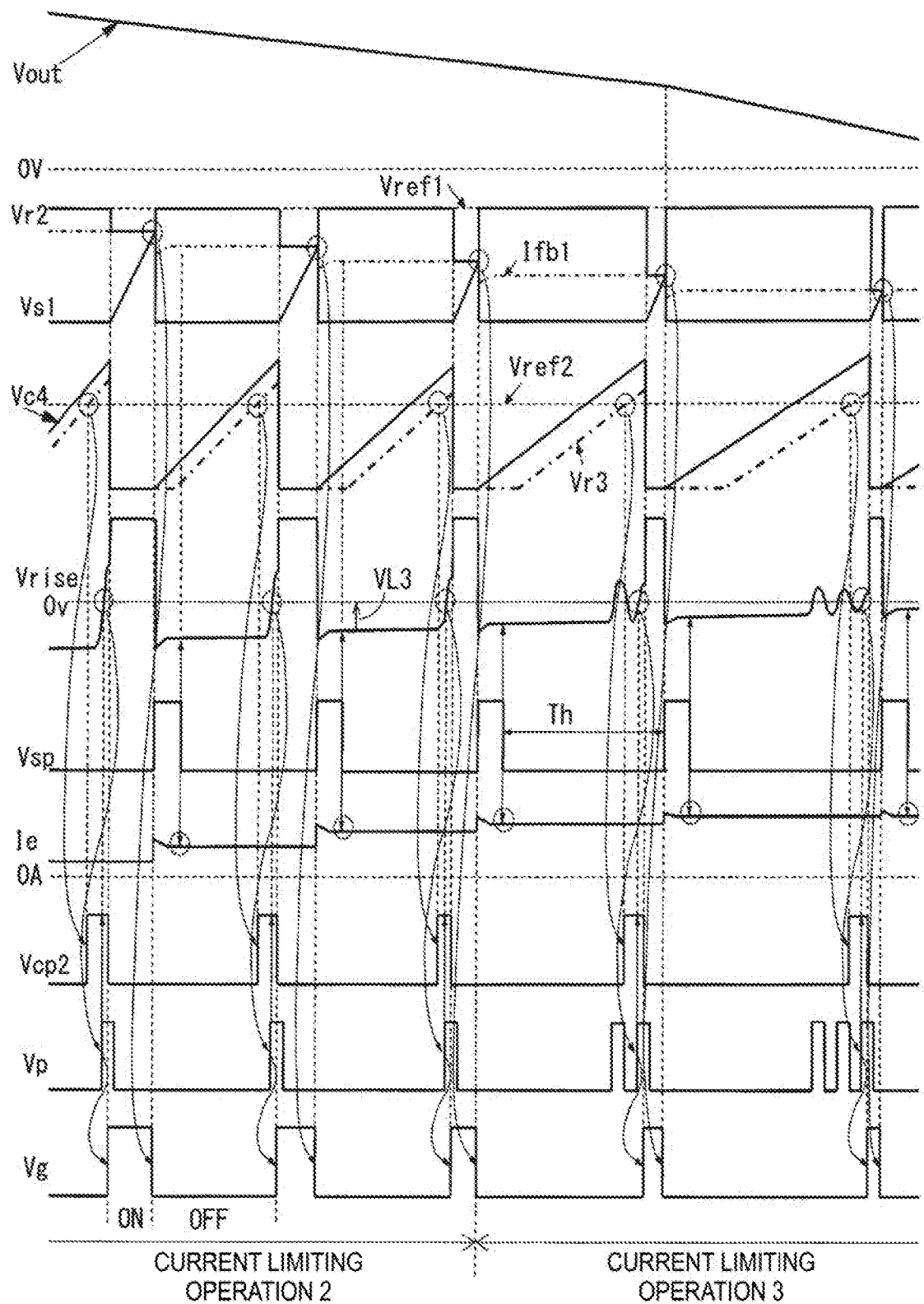
FIG. 9 is a timing chart showing transition from the current limiting operation 2 to a current limiting operation 3 of the switching power supply device of FIG. 1.

This current limiting operation is a period of a current limiting operation 2 in the timing chart of FIGS. 8 and 9. When the output voltage Vout decreases up to a voltage Vout2a as shown in FIG. 7A, the switching transistor MN1 turns off, and the voltage VL3 when the • side of the auxiliary winding L3 is a negative electrode decreases. Therefore, the current Ia flowing through the auxiliary winding L3 decreases, and the currents Ib and Ic of the current limiting feedback circuit 27 satisfy Ib=Ic. Further, when the output voltage Vout is less than the voltage Vout2a, Ib<Ic. Therefore, the feedback currents Ifb1 to Ifb3 flowing through the current holding circuit 274 are generated as currents in inverse proportion to the current Ia.

As a result, the feedback current Ifb1 flows through the on-period control circuit 21 instead of the optocoupler current Ipc1, and the feedback current Ifb2 flows through the off-period control circuit 22 instead of the optocoupler current Ipc2. The charging current of the capacitor C4 of the off-period control circuit 22 is "Ioff−Ifb3".

At this time, in the on-period control circuit 21, the first feedback current Ifb1 flows through the resistor R2 such that the voltage Vr2 is generated. However, when the output voltage Vout is low, the first feedback current Ifb1 increases such that the voltage Vr2 is low. Therefore, the timing at which the off-timing voltage Voff output from the comparator CP1 becomes "H" is advanced, and the on-period is shortened. As a result, the input energy in the on-period is shortened, and the output power is also reduced.

In the off-period control circuit 22, the second feedback current Ifb2 increases. Therefore, a time required for the voltage Vr3 of the resistor R3 to increase up to the voltage Vref2 increase, and the charging current of the capacitor C4 further decreases. Thus, a time required for the output of the comparator CP2 to invert from "L" to "H" is delayed.

In the current limiting operation 2, the critical mode operation is performed in which the conduction period of the secondary diode D1 becomes longer than the time required for the output of the comparator CP2 to invert from "L" to "H", the output voltage is retimed in the logic circuit 221 at the end of the conduction of the secondary diode D1, and the switching transistor MN1 turns on. This operation is the current limiting operation of shortening the on-period to reduce the output power, in which as the output voltage Vout decreases, the output current Iout further decreases than that in the current limiting operation 1.

On the other hand, in a case where the current limiting operation 1 is an operation in which the charging time of the capacitor 4 is not determined in the critical mode operation and the output transistor MN1 turns on at a timing of a ringing, when the output voltage is less than the voltage Vout2$a$, the current limiting operation changes to a current limiting operation 3 described below.

<Current Limiting Operation 3>

The current limiting operation is a period of a current limiting operation 3 in a timing chart of FIG. 9. When the output voltage Vout decreases in the current limiting operation such that the current Ib of the current limiting feedback circuit 27 is further less than the current Ic, the current Ie increases, the feedback currents Ifb1 to Ifb3 increase, the logic circuit 221 retimes the output voltage at the end of the conduction of the secondary diode D1 immediately after the output of the comparator CP2 is inverted, and the switching transistor MN1 turns on. Therefore, the output voltage Vout decreases to an output voltage Vout3 of FIG. 7A. When the output voltage Vout is less than the output voltage Vout3, the feedback current Ifb3 increases and the charging current (Ioff−Ifb3) of the capacitor C4 decreases such that charging time increases. In addition, after the start of a ringing, the output of the comparator CP2 is inverted, and the switching transistor MN1 turns on at a zero-cross timing of a ringing. As in the current limiting operation 2, as the first feedback current Ifb1 increases, the on-period is shortened, and the off-period increases depending on the second feedback current Ifb2 and the charging time of the capacitor C4. As a result, the on-duty decreases, and the output current Iout decreases.

When the output voltage Vout approaches 0 V on condition that the value of the resistor R1 is high and the current value of the current limiting feedback circuit 27 satisfies a relationship of Ib<<Ic, the current Id satisfies Id≅Ic, and the feedback currents Ifb1 to Ifb3 are the maximum. As a result, the on-period is minimum, and the off-period is maximum. In this state, when the output voltage Vout further decreases, the on-period is constant at the minimum, and the input energy is constant at the minimum. Therefore, the output current Iout gradually increases. These characteristics are characteristics of output voltages that are less than or equal to the output voltage Vout4 of FIG. 7A.

Figure 7B:
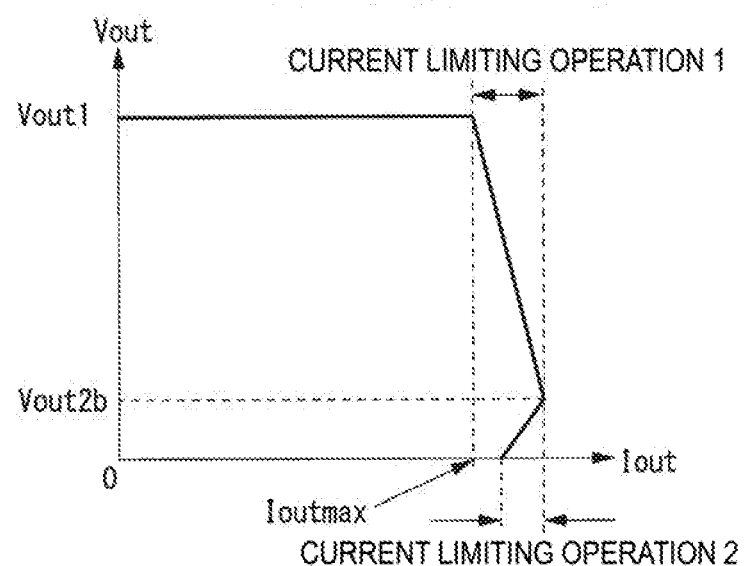
Figure 7C:
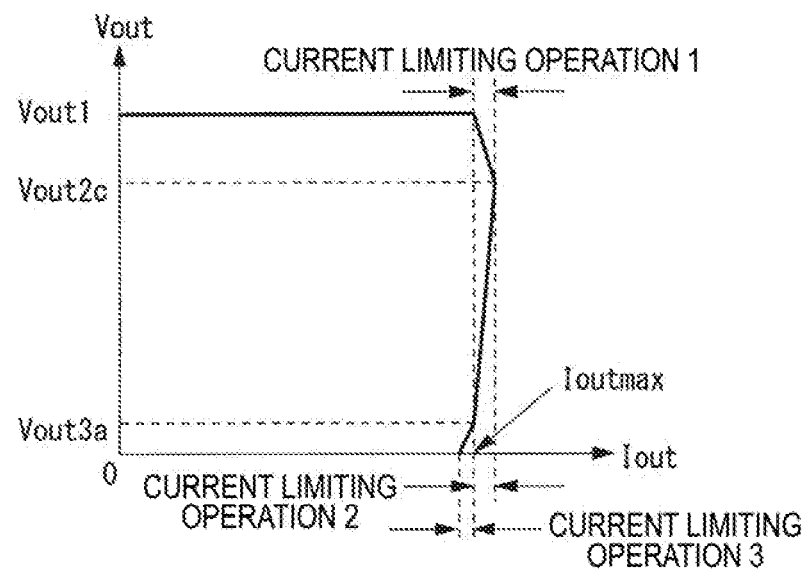

Hereinabove, the basic current limiting operation of the present invention has been described. The values of the output voltages Vout2$a$, Vout3, and Vout4 of the current limiting characteristics of FIG. 7A can be adjusted by adjusting the proportional relationship of the feedback currents Ifb1 to Ifb3. In addition, when the output voltage Vout2 at which the current value of the current limiting feedback circuit 27 satisfies Ib=Ic decreases, that is, when the output voltage to be detected is set to a low value such as Vout2$b$, current limiting characteristics having a chevron shape as shown in FIG. 7B are exhibited. Conversely, when the output voltage Vout2 at which the current value satisfies Ib=Ic increases, that is, when the output voltage to be detected is set to a value higher than Vout2$c$, characteristics hanging down as shown in FIG. 7C are exhibited. The characteristics of FIG. 7B can be realized by setting the value of the resistor R1 to be lower and setting the value of the capacitor C4 to be higher as compared to the characteristics of FIG. 7A. The characteristics of FIG. 7C can be realized by setting the value of the resistor R1 to be higher and setting the value of the capacitor C4 to be lower as compared to the characteristics of FIG. 7A. In this way, by changing the proportional relationship of the feedback currents Ifb1 to Ifb3 and the values of the resistor R1 and the capacitor C4, the output voltage Vout2 at which the feedback currents Ifb1 to Ifb3 flows can be changed. Therefore, the desired current limiting characteristics can be realized.

First Modification Example of Current Limiting Feedback Circuit 27A

Figure 10:
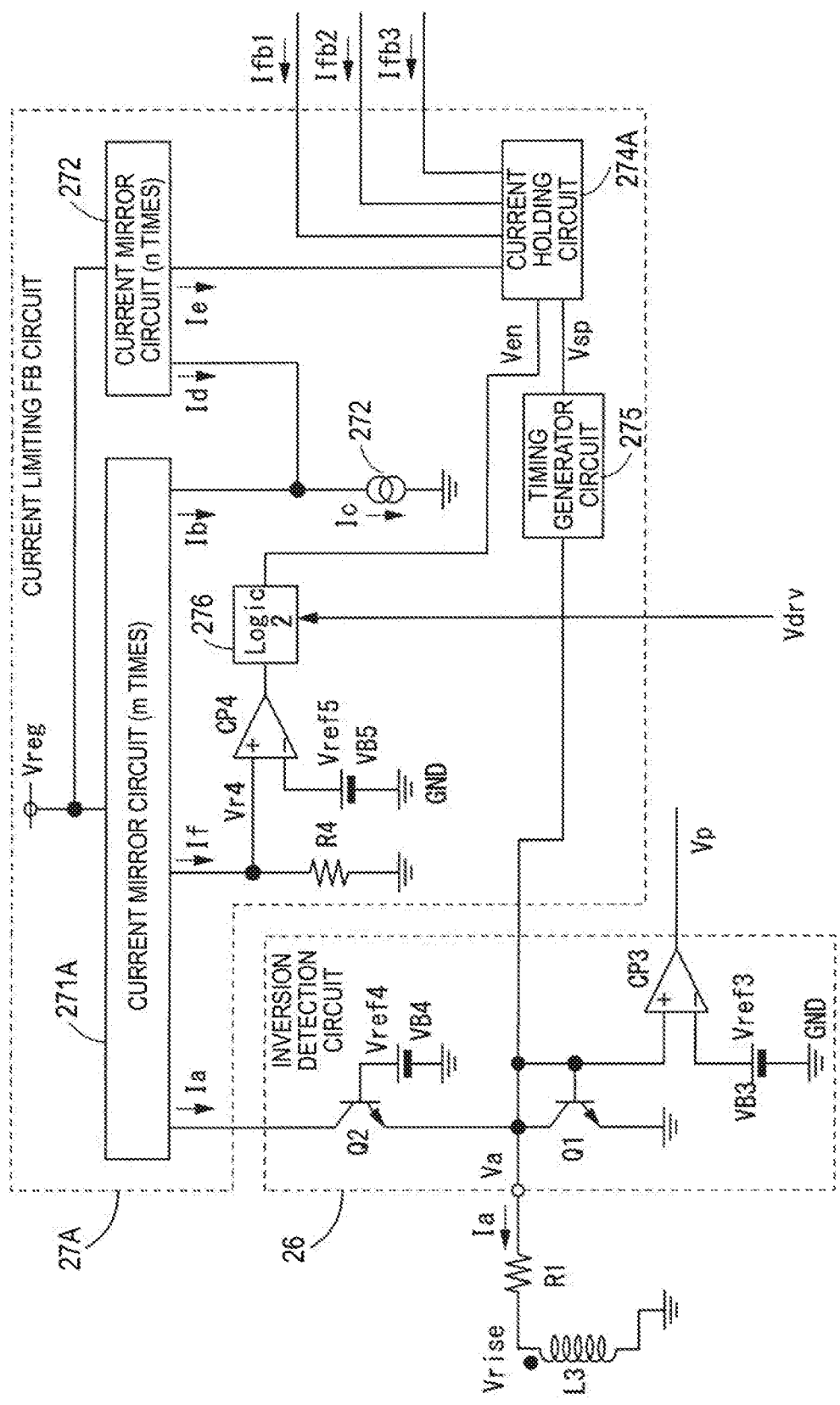
FIG. 10 is a circuit diagram showing a current limiting feedback circuit in a first modification example of the switching power supply device of FIG. 1.

FIG. 10 shows a current limiting feedback circuit 27A according to a first modification example to which a unit that detects the output voltage Vout and controls a current holding circuit 274A to be enabled is added. In the current limiting feedback circuit 27A of FIG. 10, the current If in proportion to the current Ia is drawn by a first current mirror circuit 271A, the current If is converted into a voltage Vr4 by the resistor R4, and the voltage Vr4 is compared to a reference voltage Vref5 of a voltage source VB5 by a comparator CP4 to generate an enable signal Ven. As a result, although the current value satisfies Ib<Ic, by detecting that the output voltage Vout is less than a voltage Vout2$d$ shown in FIG. 12, the current holding circuit 274A is set to be enabled by the enable signal Ven. As a result, a timing at which the feedback currents Ifb1, Ifb2, and Ifb3 start generation and a timing at which the current limiting operation switches from the current limiting operation 1 to the current limiting operation 2 can be stabilized.

In the state of the current limiting operation 1 of the period in which the switching transistor MN1 turns off, a decrease in the output voltage Vout is small. Therefore, the current Ia is not low, and the voltage Vr4 generated from the resistor R4 through which the current if in proportion to the current Ia flows is higher than the reference voltage Vref5. Thus, the output of the comparator CP4 becomes "H". That is, when the output voltage Vout is higher than the voltage Vout2$d$, the output of the comparator CP4 becomes "H". In the period in which the switching transistor MN1 turns on, the current Ia does not flow, and the current If also does not flow. Therefore, the output of the comparator CP4 becomes "L".

In a case where the signal Vdrv (="L") for turning off the switching transistor MN1 is input, when the output voltage Vout is higher than the voltage Vout2$d$ and the output of the comparator CP4 is "H", the logic circuit 276 sets the signal Ven to "L". At this time, even when the current value of the current limiting feedback circuit 27A satisfies Ib<Ic, the current holding circuit 274A does not operate.

When the output voltage Vout is less than the voltage Vout2$d$, the current If decreases along with a decrease in the current Ia, and the voltage Vr4 generated from the resistor R4 is less than the voltage Vref5. Accordingly, the output of the comparator CP4 remains "L", the signal Ven remains "H", and the current holding circuit 274A remains enabled.

Figure 11:
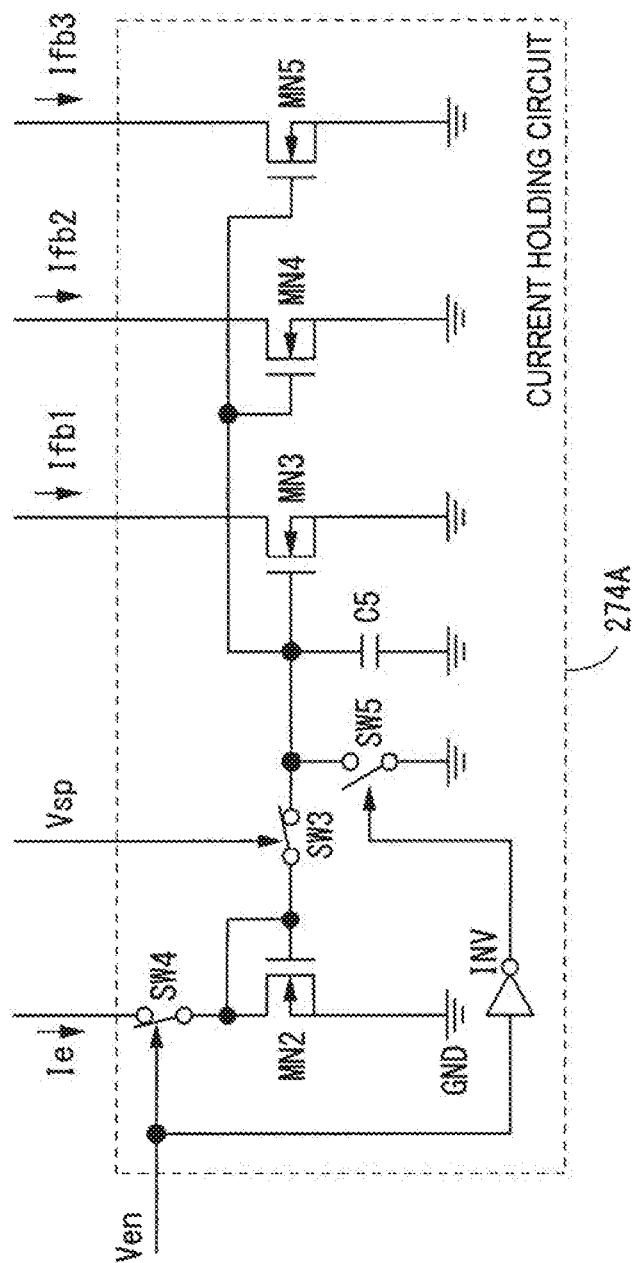
FIG. 11 is a circuit diagram showing a current holding circuit of the current limiting feedback circuit of FIG. 10 and FIG. 14.

FIG. 11 is a circuit diagram showing the current holding circuit 274A of the current limiting feedback circuit of FIG. 10. In order to deal with the signal Ven, switches SW4 and SW5 are added to the current holding circuit 274 shown in FIG. 4. When the signal Ven is set to "H", the switch SW4 turns on and the switch SW5 turns off such that the current mirror circuit operates and the current holding circuit 274A operates.

Figure 12:
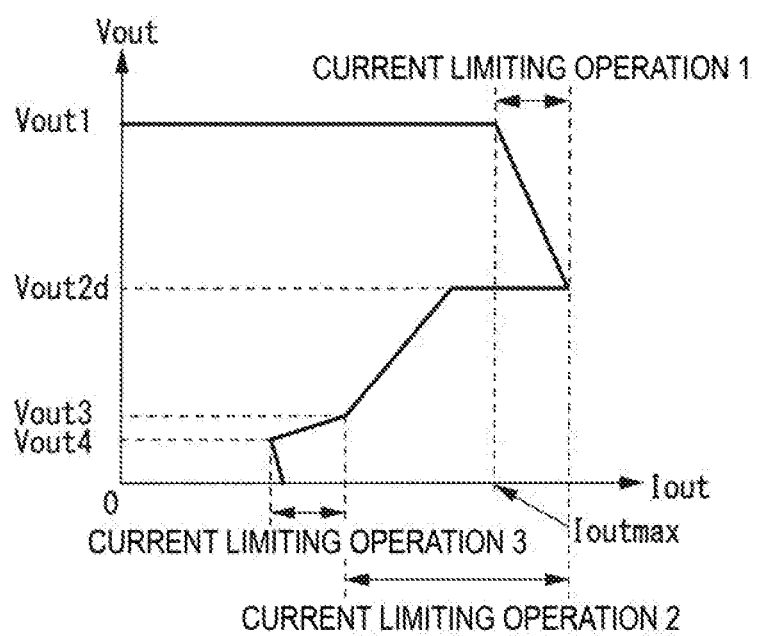
FIG. 12 is a characteristic diagram showing a current limiting operation when the current limiting feedback circuit of FIG. 10 is used.

As described above, in a case where the voltage Vref5 is set such that the output voltage Vout at which the signal Ven is held at "H" is the voltage Vout2d that is less than the output voltage at which the current value satisfies Ib<Ic, when the output voltage Vout is less than the voltage Vout2d as in the current limiting characteristics of FIG. 12, the current limiting operation switches to the current limiting operation 2 such that the current is rapidly limited. When the proportional relationship of the feedback currents Ifb1 to Ifb3 of the current limiting feedback circuit 274 having the current limiting characteristics of FIG. 7A and the values of the resistor R1 and the capacitor C4 are set as the same, the current limiting characteristics of the voltage Vout3 and the voltage Vout4 that are less than the output voltage Vout2d in FIG. 12 are the same as shown in FIG. 7A.

Figure 13:
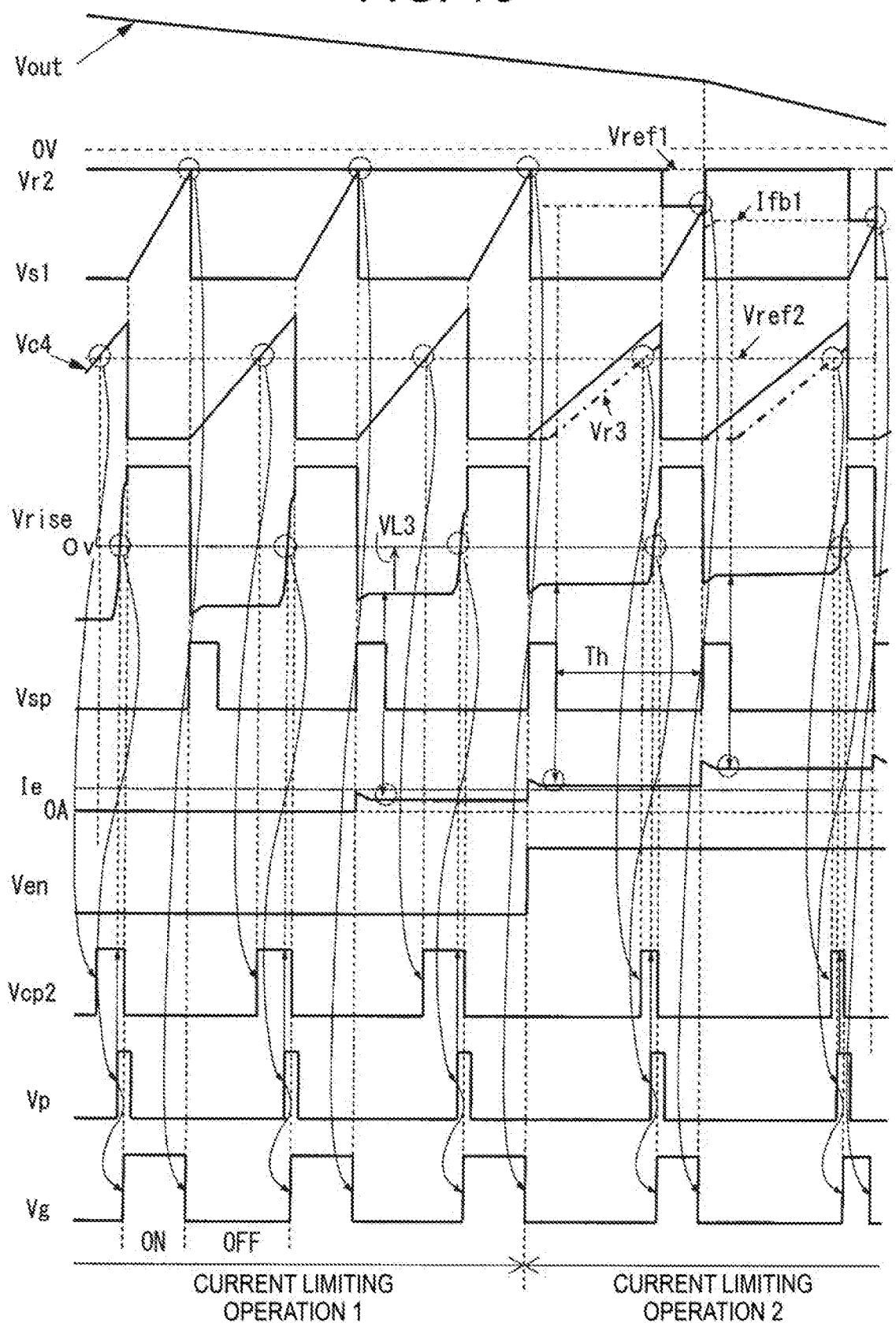
FIG. 13 is a timing chart showing transition from a current limiting operation 1 to a current limiting operation 2 when the current limiting feedback circuit of FIG. 10 is used.

FIG. 13 is a timing chart showing this current limiting operation. FIG. 13 shows a switching portion between the current limiting operation 1 and the current limiting operation 2. A difference from FIG. 8 showing the timing chart of the current limiting operation in which the output voltage Vout is not detected by the comparator CP4 is that a waveform of the signal Ven is added. In FIG. 8, when the current value of the current limiting feedback circuit 27 satisfies Ib<Ic, the current Ie flows, and the current limiting operation switches from the current limiting operation 1 to the current limiting operation 2. However, in FIG. 13, even when the current value satisfies Ib<Ic such that the current Ie flows, after the signal Ven changes from "L" to "H", the current holding circuit 274A operates, and the current limiting operation switches from the current limiting operation 1 to the current limiting operation 2.

Second Modification Example of Current Limiting Feedback Circuit 27B

Figure 14:
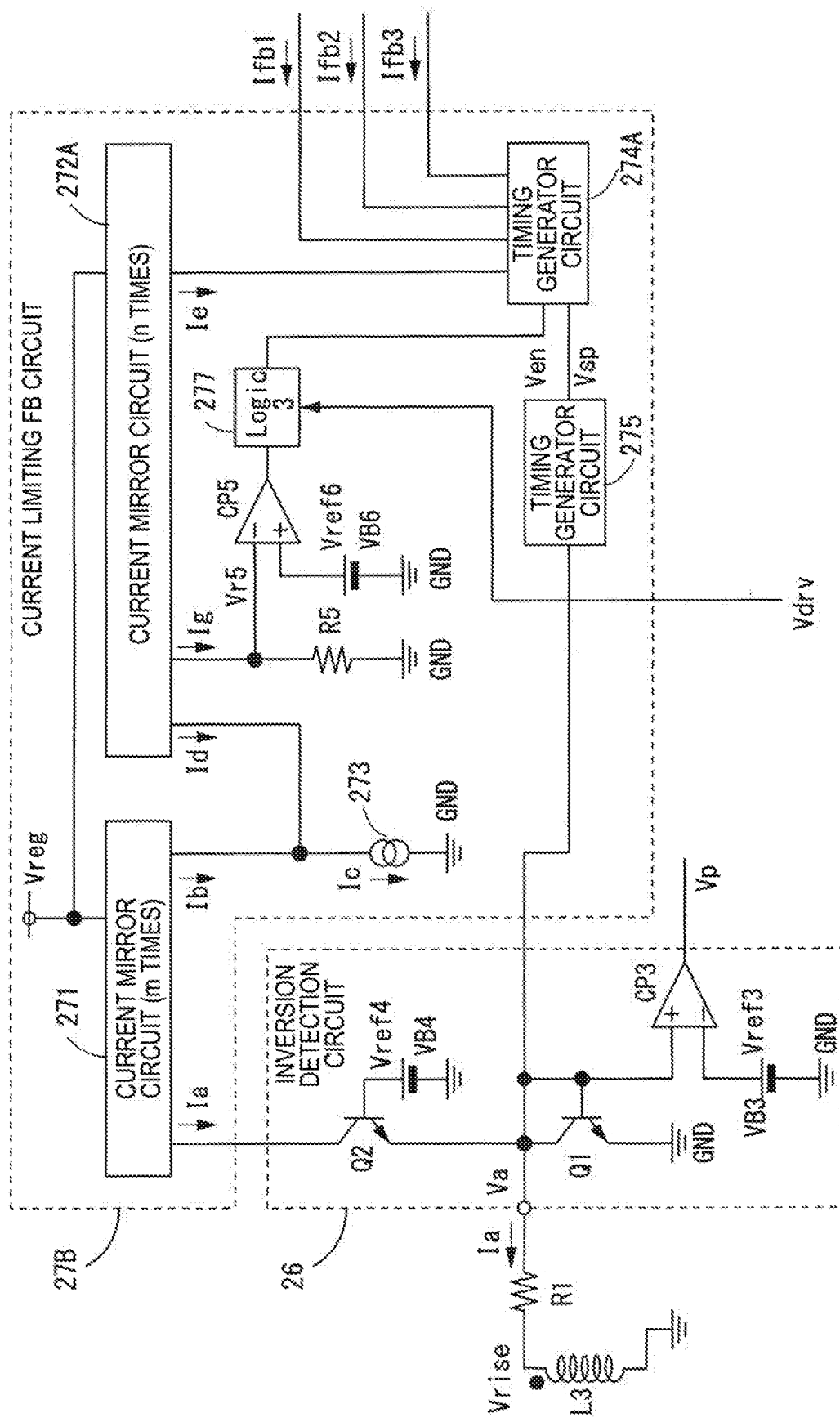
FIG. 14 is a circuit diagram showing a current limiting feedback circuit in a second modification example of the switching power supply device of FIG. 1.

FIG. 14 shows a current limiting feedback circuit 27B according to a second modification example to which a unit that detects the output voltage Vout and controls the current holding circuit 274A to be enabled is added. In the current limiting feedback circuit 27B of FIG. 14, as in the circuit shown in FIG. 4, a comparative current Ig is drawn in a second current mirror 272A to which Id (=Ic−Ib) that is a difference between the current Ib and the current Ic is input, and the current Ig, the voltage Vr5 generated from the resistor R5, and a voltage Vref6 of a voltage source VB6 are compared to each other in the comparator CP5.

In the state of the current limiting operation 1 of the period in which the switching transistor MN1 turns off, the current value of a current limiting feedback circuit 28B satisfies Ib>Ic. Therefore, the current Id does not flow, the current Ig also does not flow, and the output of the comparator CP5 becomes "H". In the period in which the switching transistor MN1 turns on, the current Ia does not flow. Therefore, the current value satisfies Ib=0 and Id=Ic, the current Ig flows, the voltage Vr5 generated from the resistor R5 is higher than the voltage Vref6, and the output of the comparator CP5 becomes "L".

In a case where the signal Vdrv (="L") for turning off the switching transistor MN1 is input, when the output voltage Vout is higher than the voltage Vout2d and the output of the comparator CP5 is "H", the logic circuit 277 sets the signal Ven to "L". At this time, even when the current value of the current limiting feedback circuit 27B satisfies Ib<Ic, the current holding circuit 274A does not operate.

As the output voltage Vout decreases, the current Ia decreases, and the current Ib also decreases such that Ib<Ic is satisfied. When the current Id flows and the voltage Vr5 generated from the resistor R5 at the current Ig is higher than the voltage Vref6, the output of the comparator CP4 remains "L", and the signal Ven remains "H".

Third Modification Example of Current Limiting Feedback Circuit 27C

Figure 15:
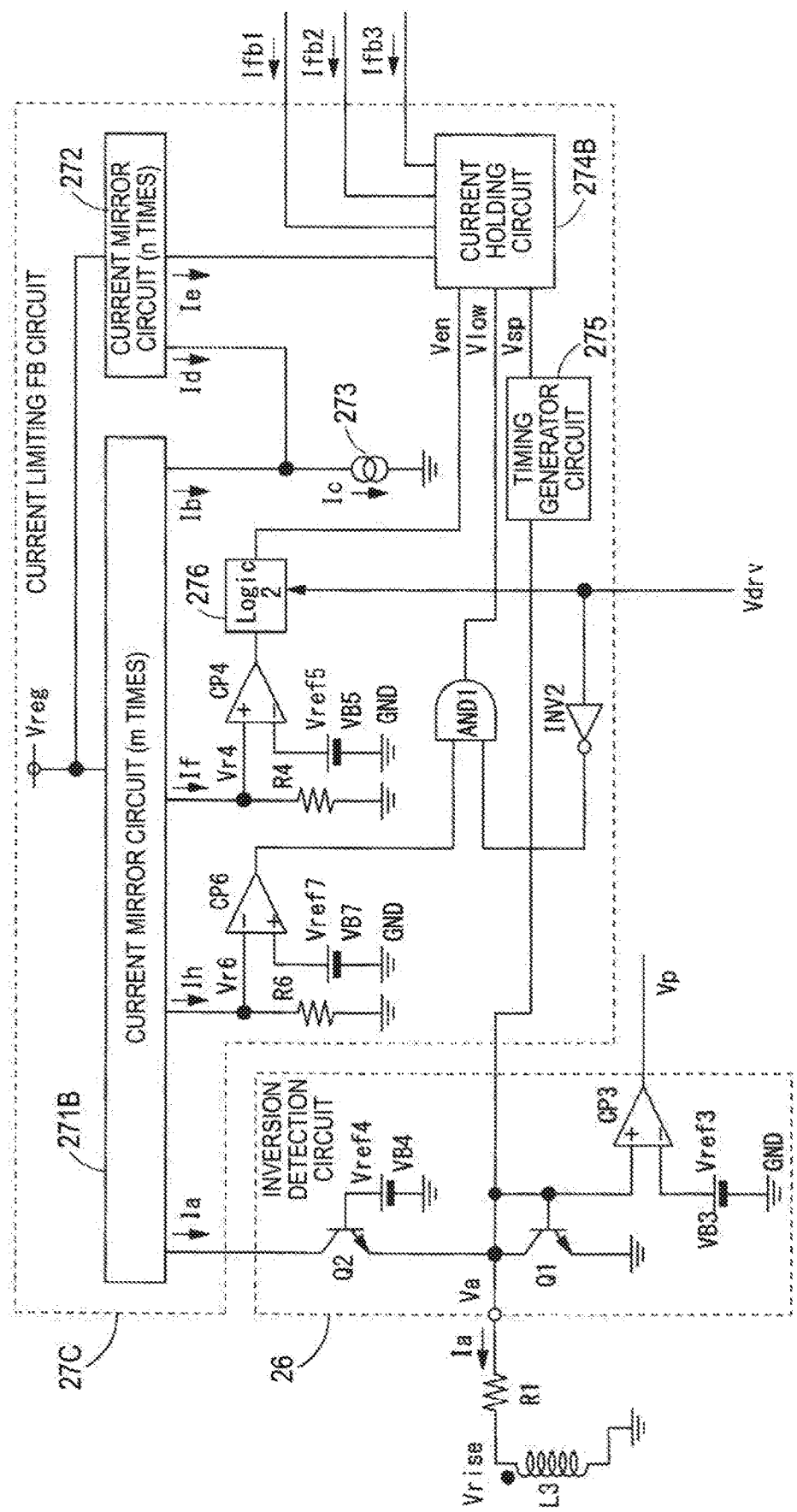
FIG. 15 is a circuit diagram showing a current limiting feedback circuit in a third modification example of the switching power supply device of FIG. 1.
Figure 16:
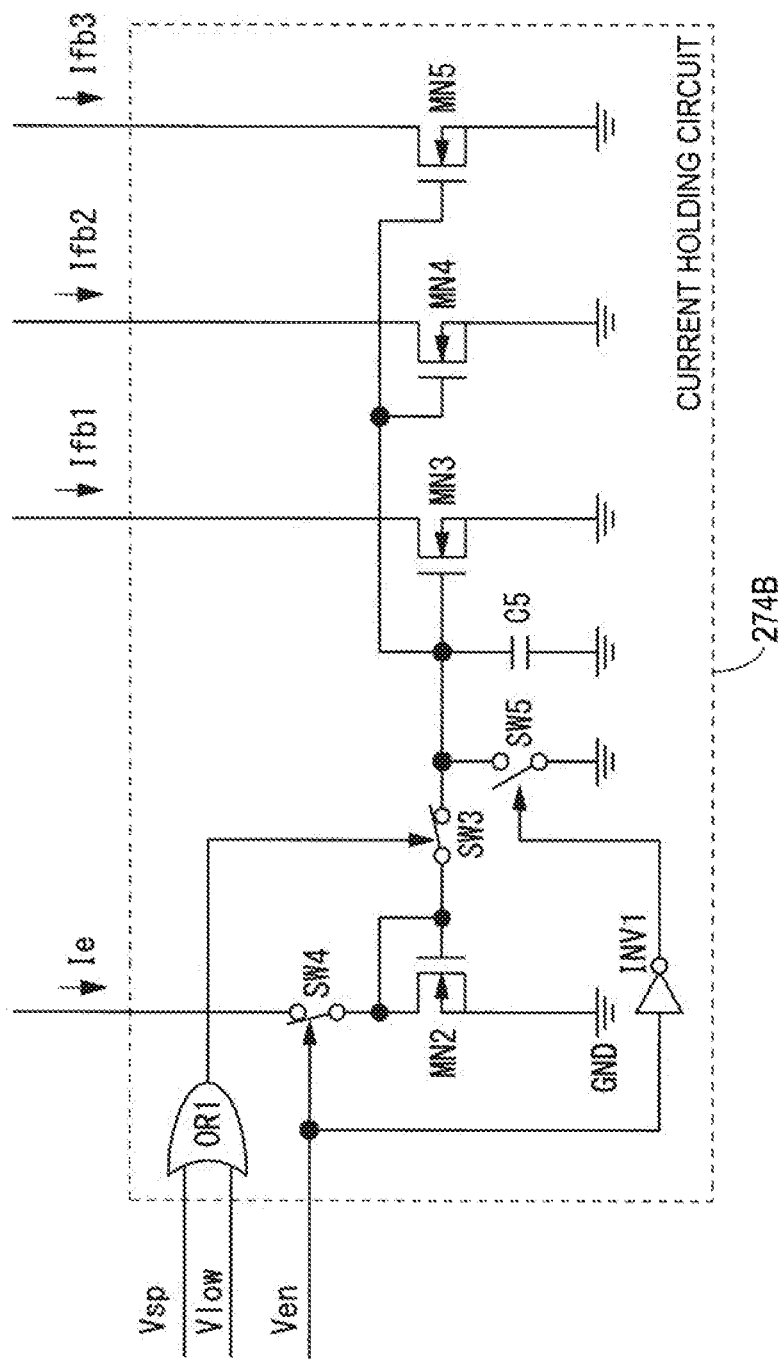
FIG. 16 is a circuit diagram showing a current holding circuit of the current limiting feedback circuit of FIG. 15 and FIG. 17.

FIG. 15 shows a current limiting feedback circuit 27C according to a third modification example to which a unit that releases the current holding of a current holding circuit 274B is added when the output voltage Vout decreases to about 0 V. The current limiting feedback circuit 27C is obtained by modifying the current limiting feedback circuit 27A of FIG. 10. FIG. 16 shows the current holding circuit 274B in the current limiting feedback circuit 27B.

In the current limiting feedback circuit 27C of FIG. 15, a current Ih in proportion to the current Ia is drawn by a first current mirror circuit 271B, the current Ih is converted into the voltage Vr6 by a resistor R6, and the voltage Vr6 is compared to a reference voltage Vref7 of a voltage source VB7 by a comparator CP6. When the voltage Vr6 is less than the reference voltage Vref7, a signal Vlow is set to "H". The signal Vlow is input to the current holding circuit 274B through an AND circuit AND1 controllable by an inverter INV2 inverting the signal Vlow into the signal Vdrv.

The current holding circuit 274B of FIG. 16 is obtained by adding an OR circuit OR1 that turns on a switch SW3 for sampling when either the voltage Vsp or the voltage Vlow is "H" to the current holding circuit 274A of FIG. 11.

When the switching transistor MN turns off, the state of the output voltage Vout can be detected by the current Ia. However, when the output voltage Vout decreases to be less than Vout4 and approaches 0 V, the current Ia decreases, and the currents Ifb1, Ifb2, and Ifb3 to be held increases. As a result, in particular, the charging current (=Ioff−Ifb3) of the capacitor C4 that controls the off-period is shortened, and thus the off-period is affected by a variation in the current Ifb3.

At this time, the current Ih also decreases. Therefore, when the voltage Vr6 is less than the reference voltage Vref7, the signal Vlow output from the comparator CP6 is "H". At this time, the signal Vdrv is "L". Therefore, the AND gate AND1 is opened by the inverter INV2, the signal Vlow of "H" is input to the current holding circuit 274B as it is, the switch SW3 turns on, and the current holding is released. As a result, the feedback currents Ifb1 to Ifb3 are controlled by the current Ie.

At this time, when the conduction period of the secondary diode D1 ends in the current limiting operation 3 and a ringing period starts the output current Iout satisfies current Ia=0. Therefore, current Id=Ic and Ie=maximum are satisfied, the feedback current Ifb3 is maximum, and the charging current (=Ioff−Ifb3) of the capacitor C4 further decreases. As a result, the off-period increases, and the short circuit load current when the output voltage Vout decreases can be reduced.

Fourth Modification Example of Current Limiting Feedback Circuit 27D

Figure 17:
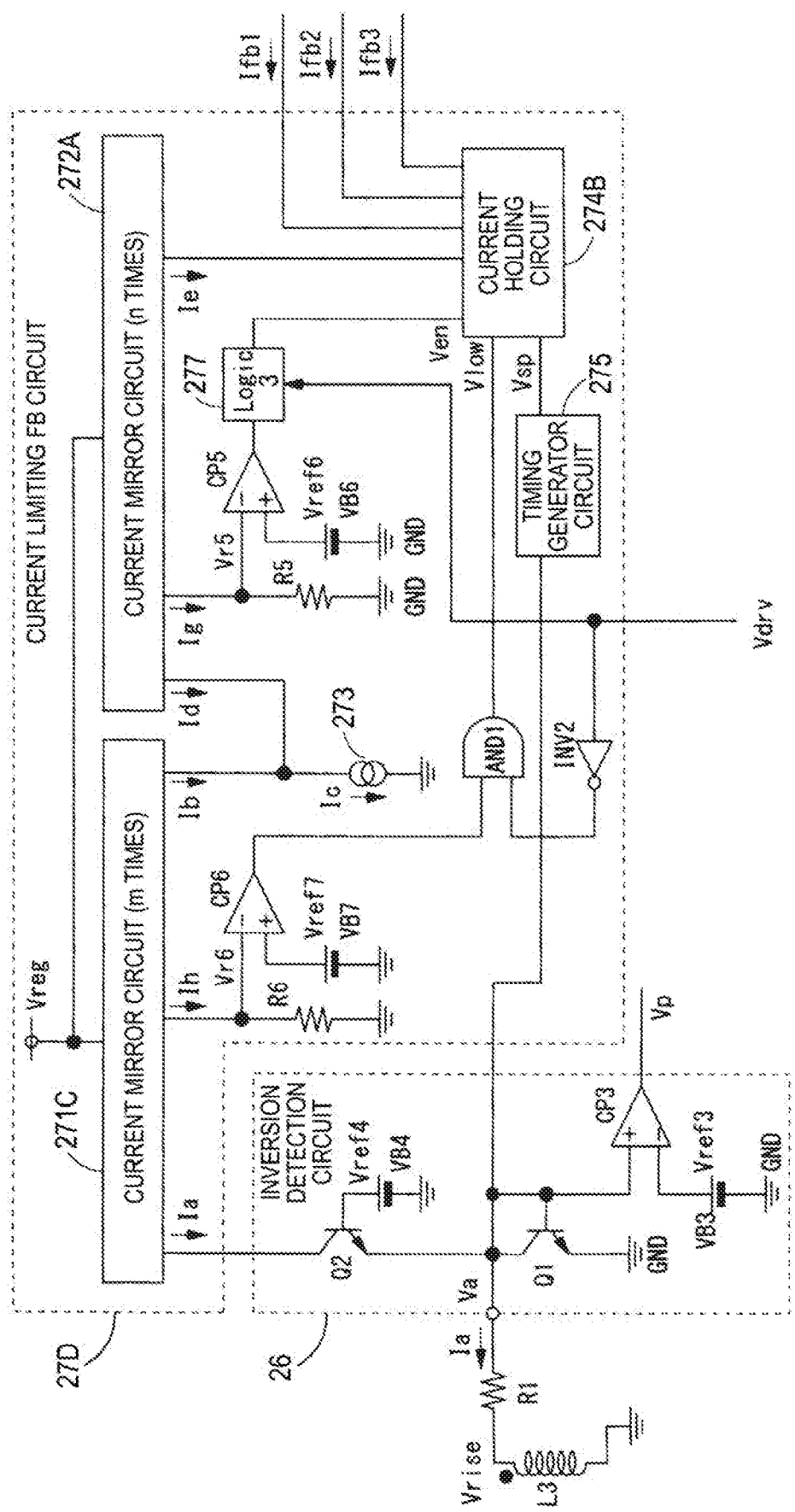
FIG. 17 is a circuit diagram showing a current limiting feedback circuit in a fourth modification example of the switching power supply device of FIG. 1.

FIG. 17 shows a current limiting feedback circuit 27D according to a fourth modification example to which a unit that releases the current holding of a current holding circuit 274B is added when the output voltage Vout decreases to about 0 V. The current limiting feedback circuit 27D is obtained by modifying the current limiting feedback circuit 27B of FIG. 14. The current holding circuit 274B in the current limiting feedback circuit 27D is the same as shown in FIG. 16. Since the configurations and the operations shown in FIGS. 14 and 16 are the same, the detailed description thereof will not be repeated.

Other Modification Examples

In the above-described embodiment, a decrease of the output voltage Vout to the voltage Vout2$a$, Vout2$b$, or Vout2$c$ is detected using the voltage obtained from the auxiliary winding L3 in the off-period of the switching transistor MN1 by detecting that the current Ia decreases and Ib<Ic is satisfied when the voltage obtained from the auxiliary winding L3 in the off-period of the switching transistor MN1 is a negative voltage and the negative voltage VL3 reaches a given value.

However, the present invention is not limited to the example, the decrease may be detected by detecting that the current Ia decreases and Ib<Ic is satisfied when the voltage obtained from the auxiliary winding L3 in the off-period of the switching transistor MN1 is a positive voltage and the positive voltage reaches a given value. That is, the decrease may be detected by detecting that the current Ia decreases and Ib<Ic is satisfied when the absolute value of the voltage obtained from the auxiliary winding L3 in the off-period of the switching transistor MN1 is less than a predetermined value. The same applies to the detection of the voltage Vout2$d$ enabled shown in FIGS. 10 to 14.

DESCRIPTION OF REFERENCE NUMERALS AND SIGNS

10: transformer
L1: primary winding
L2: secondary winding
L3: auxiliary winding
20: control circuit
21: on-period control circuit
22: off-period control circuit
221: logic circuit
23: SRFF circuit
24: drive circuit
25: charging circuit
26: inversion detection circuit
27, 27A, 27B, 27C, 27D: current limiting feedback circuit
271, 271A, 271B, 271C: first current mirror circuit
272, 272A: second current mirror circuit
274, 274A, 274B: current holding circuit
275: timing generator circuit
276, 277: logic circuit
28: Ipc distribution circuit
29: internal power supply circuit
30: output voltage feedback circuit
40: optocoupler

What is claimed is:

1. A switching power supply device comprising:
a switching transistor controllable to turn on and turn;
a sense resistor that is configured to generate a sense voltage when the switching transistor turns-on;
a transformer including a primary winding to which an input voltage is applied when the switching transistor is turned-on, a secondary winding that is configured to supply an output voltage to a load, and an auxiliary winding that is configured to detect the output voltage;
an optocoupler that is configured to generate a first optocoupler current and a second optocoupler current corresponding to the output voltage;
a current limiting feedback circuit that is configured to generate a first feedback current, a second feedback current, and a third feedback current using an undulating voltage of the auxiliary winding, the first feedback current, the second feedback current, and the third feedback current being in inverse proportion to the output voltage;
an on-period control circuit that is configured to receive the sense voltage, the first optocoupler current, and the first feedback current and generate an off-timing signal of the switching transistor; and
an off-period control circuit that is configured to charge by a constant current or a difference current between the constant current and the third feedback current, receive a charging voltage of a fourth capacitor discharged when the switching transistor is turns-on, the second feedback current, and the second optocoupler current, and generate an on-timing signal of the switching transistor,
wherein when a load voltage is less than or equal to a second output voltage that is less than a first output voltage, the current limiting feedback circuit is configured to generate the first feedback current, the second feedback current, and the third feedback current,
wherein when the load voltage is higher than the first output voltage, the on-period control circuit is configured to receive the sense voltage and the first optocoupler current and the off-period control circuit is configured to receive the charging voltage of the fourth capacitor charged by the constant current and the second optocoupler current, and
wherein when the output voltage is less than the second output voltage, the on-period control circuit is configured to receive the sense voltage and the first feedback current, and the off-period control circuit is configured to receive the charging voltage of the fourth capacitor charged by the difference current between the constant current and the third feedback current and the second feedback current.

2. The switching power supply device according to claim 1,
wherein when the load voltage is less than the second output voltage, the current limiting feedback circuit is controlled to be enabled.

3. The switching power supply device according to claim 1,
wherein the first feedback current, the second feedback current, and the third feedback current of the current limiting feedback circuit are independent of each other, and the first optocoupler current and the second optocoupler current are independent of each other.

4. The switching power supply device according to claim 1, further comprising:
a first resistor that is connected between the auxiliary winding and the current limiting feedback circuit,
wherein the first feedback current, the second feedback current, and the third feedback current are currents that are held at an inversion timing of the undulating voltage generated in the auxiliary winding, and
wherein the currents are inverse proportion to a current that flows through the first resistor by the undulating voltage generated in the auxiliary winding in an off-period of the switching transistor.

5. The switching power supply device according to claim 1,
wherein the on-period control circuit is configured to generate the off-timing signal of the switching transistor at an earlier timing as the first optocoupler current is increasing, as the first feedback current is increasing, and as the sense voltage is increasing, and
wherein the off-period control circuit is configured to generate the on-timing signal of the switching transistor at a slower timing as the second optocoupler current is increasing, as the second feedback current is increasing, and as the third feedback current is increasing.

6. The switching power supply device according to claim 5,
wherein the on-timing signal of the off-period control circuit is retimed at an inversion timing of an undulating voltage generated in the auxiliary winding.

7. The switching power supply device according to claim 1,
wherein the on-period control circuit includes a second resistor and a first comparator,
wherein the second resistor is inserted into a path through which the first optocoupler current or the first feedback current flows when the switching transistor turns on, and
wherein the first comparator is configured to generate the off-timing signal when a second voltage generated at an introduction side of the first feedback current or the first optocoupler current of the second resistor is the same as the sense voltage.

8. The switching power supply device according to claim 1,
wherein the off-period control circuit includes a third resistor and a second comparator,
wherein the third resistor is inserted such that a voltage drop from the charging voltage of the fourth capacitor occurs due to the second optocoupler current or the second feedback current, and
wherein the second comparator is configured to generate the on-timing signal when a third voltage of a terminal of the third resistor on a side opposite to the fourth capacitor side is a predetermined value.

9. The switching power supply device according to claim 1,
wherein the current limiting feedback circuit includes a current holding circuit, and
wherein the current holding circuit generates a sampled signal in inverse proportion to the output voltage at a timing at which the switching transistor turns off when the load voltage is less than or equal to the second output voltage less than the first output voltage, and hold the first feedback current, the second feedback current and the third feedback current that are corresponding to the sampled signal until the switching transistor turns off after the signal is sampled.

10. The switching power supply device according to claim 9,
wherein when the load voltage is less than or equal to a predetermined voltage that is less than the second output voltage, the current holding circuit is configured to release the holding of the first feedback current, the second feedback current, and the third feedback current and the first feedback current, the second feedback current, and the third feedback current are configured to be output in inverse proportion to the load voltage.

* * * * *